US012089615B2

(12) United States Patent
Ghotra et al.

(10) Patent No.: US 12,089,615 B2
(45) Date of Patent: Sep. 17, 2024

(54) FOOD PRODUCTS COMPRISING FILAMENTOUS FUNGAL MATERIAL

(71) Applicant: The Fynder Group, Inc., Chicago, IL (US)

(72) Inventors: Baljit Ghotra, Chicago, IL (US); Yuval Avniel, Chicago, IL (US); Brian Klopf, Chicago, IL (US); Jessica Kawabata, Chicago, IL (US); Eric Carre, Grayslake, IL (US); Eleanore Brophy Eckstrom, Chicago, IL (US)

(73) Assignee: The Fynder Group, Inc., Chicago, IL (US)

( * ) Notice: Subject to any disclaimer, the term of this patent is extended or adjusted under 35 U.S.C. 154(b) by 0 days.

(21) Appl. No.: 18/202,188

(22) Filed: May 25, 2023

(65) Prior Publication Data

US 2023/0380447 A1   Nov. 30, 2023

Related U.S. Application Data

(63) Continuation of application No. 17/701,605, filed on Mar. 22, 2022.

(60) Provisional application No. 63/164,466, filed on Mar. 22, 2021.

(51) Int. Cl.
*A23L 31/00* (2016.01)
*A23J 3/22* (2006.01)
*A23L 33/21* (2016.01)

(52) U.S. Cl.
CPC ............. *A23J 3/227* (2013.01); *A23L 31/00* (2016.08); *A23L 33/21* (2016.08); *A23V 2002/00* (2013.01)

(58) Field of Classification Search
CPC .......... A23J 3/227; A23L 33/21; A23L 31/00; A23V 2002/00
USPC .......................................................... 426/7
See application file for complete search history.

(56) References Cited

U.S. PATENT DOCUMENTS

| 3,928,634 A | 12/1975 | Gasbarro | |
| 2009/0098254 A1* | 4/2009 | Baublits | A23B 4/12 426/310 |
| 2016/0015070 A1* | 1/2016 | Schmulevitz | A23L 13/55 426/280 |
| 2016/0213011 A1* | 7/2016 | Howard | A23B 4/005 |
| 2020/0093167 A1* | 3/2020 | Pattillo | A23K 10/12 |

OTHER PUBLICATIONS

International Preliminary Report on Patentability for International (PCT) Patent Application No. PCT/US2022/021369, dated Oct. 5, 2023, 12 pages.
Official Action for U.S. Appl. No. 17/701,605, dated Nov. 7, 2023, 8 pages.
Notice of Allowance for U.S. Appl. No. 17/701,605, dated Mar. 20, 2024, 9 pages.

* cited by examiner

*Primary Examiner* — Hamid R Badr
(74) *Attorney, Agent, or Firm* — Sheridan Ross P.C.

(57) ABSTRACT

Filamentous fungal food compositions are disclosed, as are methods of making such filamentous fungal food compositions. The filamentous fungal food compositions may serve as analogs of conventional non-fungal food products, particularly meat products such as meat jerky. The methods of manufacture of the filamentous fungal food compositions may include processing of filamentous fungal biomass under sub-atmospheric pressure.

28 Claims, 9 Drawing Sheets

FOOD PRODUCTS COMPRISING FILAMENTOUS FUNGAL MATERIAL

CROSS-REFERENCE TO RELATED APPLICATION

This application is a continuation of U.S. patent application Ser. No. 17/701,605, filed 22 Mar. 2022, which claims the benefit of priority of U.S. Provisional Patent Application 63/164,466, filed 22 Mar. 2021, the entirety of which is incorporated herein by reference.

FIELD OF THE INVENTION

This application relates generally to food products comprising filamentous fungal material and methods for the manufacture thereof, and particularly to food products that may serve as analogs or replicas of conventional food products but having improved properties relative thereto.

BACKGROUND OF THE INVENTION

Many conventional processed food products, such as smoked meats or dehydrated meats e.g. meat jerky, include an allergenic substance and/or a substance that is derived or obtained from animals, and may therefore be unsuitable for consumption by persons with dietary restrictions, e.g. persons wishing to reduce or eliminate animal meat intake or with allergic sensitivities. Existing hypoallergenic or vegan alternatives to conventional processed food products often suffer from poor stability and/or shelf life, unappealing taste or texture, and so on. Moreover, many of these conventional processed food products, as a result of processing conditions or requirements for attaining a particular taste, texture, or shelf life, have nutritional drawbacks; by way of non-limiting example, conventional meat jerky is often high in humectants, e.g. sugar, salt, etc. (which must be used in significant quantities during processing as a stabilizer and for its plasticizing effect to achieve jerky's characteristic tough texture), and smoked or otherwise processed conventional meat products are often high in fat (as a result of the fatty tissues from which they are obtained) and/or salt (for flavoring and extension of shelf life). Furthermore, because meat has a high moisture content and water activity, meat products either suffer from short shelf lives or must be dehydrated to a very substantial degree.

There is thus a need in the art for food products that are analogous in taste, texture, and other aesthetic and sensory characteristics to conventional processed food products, but that can be provided at lower cost and/or with an improved nutritional profile. It is further advantageous for such processed food products to be optionally free of allergenic or animal-derived products to allow these products to appeal to a wider range of potential consumers, and to remain stable over extended periods to provide for a longer usable shelf life, for example by having lower activity or moisture content and/or by including a coating or sealing layer to retain internal moisture and provide a substantially hermetic barrier while avoiding colonization by microbes, while still retaining a desired texture.

SUMMARY OF THE INVENTION

In one aspect of the present invention, a method for preparing a food product comprises (a) contacting a filamentous fungal biomass with a solution; (b) size-reducing the filamentous fungal biomass to form a plurality of filamentous fungal pieces; and (c) treating the plurality of filamentous fungal pieces to form the food product. Steps (a) and (b) may be performed simultaneously or sequentially in any order.

In embodiments, the solution may comprise at least one of sodium chloride, a food seasoning, an edible protein, and a fibrous base material.

In embodiments, a mass of the solution may be between about 1% and about 30% of a mass of the filamentous fungal biomass prior to contacting the solution.

In embodiments, step (a) may be carried out under sub-atmospheric pressure. The sub-atmospheric pressure may, but need not, be a pressure of between about zero and about 101.325 kilopascals, or no more than about 0.1 pascals.

In embodiments, step (a) may be carried out under a reduced-oxygen and/or nitrogen-enriched atmosphere.

In embodiments, step (a) may comprise the sub-step of removing water from the filamentous fungal biomass.

In embodiments, step (a) may be carried out by agitating the filamentous fungal biomass together with the solution.

In embodiments, the filamentous fungal biomass may absorb or otherwise take up an amount of the solution equal to at least about 5 wt %, at least about 10 wt %, at least about 15 wt %, at least about 20 wt %, at least about 25 wt %, or at least about 30 wt % of the total (i.e., "wet" or prior to dehydration/removal of water) weight of the filamentous fungal biomass.

In embodiments, step (a) may comprise contacting at least two filamentous fungal biomasses with the solution; the method may further comprise, between steps (a) and (b), aggregating the at least two filamentous fungal biomasses to form a filamentous fungal aggregate; and step (b) may comprise size-reducing the filamentous fungal aggregate. The aggregate may, but need not, comprise a casing that encases the at least two filamentous fungal biomasses. The aggregating step may, but need not, be carried out under sub-atmospheric pressure, which may, but need not, be a pressure of no more than about 0.1 pascals. The aggregating step may, but need not, comprise crust-freezing the at least two filamentous fungal biomasses.

In embodiments, step (b) may comprise at least one of cutting, shredding, and shaving the filamentous fungal biomass. The plurality of filamentous fungal pieces may, but need not, comprise at least one of strips, shreds, and shavings of the filamentous fungal biomass.

In embodiments, at least one of an average length, an average width, and an average depth of the plurality of filamentous fungal pieces may be between about 0.5 mm and about 1.0 mm.

In embodiments, step (c) may comprise at least one of roasting the plurality of filamentous fungal pieces, baking the plurality of filamentous fungal pieces, boiling the plurality of filamentous fungal pieces, frying the plurality of filamentous fungal pieces, steaming the plurality of filamentous fungal pieces, cold-smoking the plurality of filamentous fungal pieces, and hot-smoking the plurality of filamentous fungal pieces.

In embodiments, the solution may be an aqueous solution.

In embodiments, the solution may be a non-aqueous solution.

In another aspect of the present invention, a method for preparing a food product comprises (a) contacting a filamentous fungal biomass with a solution; and (b) dehydrating the filamentous fungal biomass.

In embodiments, the food product may be a meat jerky analog food product.

In embodiments, the solution may comprise at least one of sodium chloride, a food seasoning, and an edible protein.

In embodiments, a mass of the solution may be between about 1% and about 30% of a mass of the filamentous fungal biomass prior to contacting the solution.

In embodiments, step (a) may be carried out under sub-atmospheric pressure. The sub-atmospheric pressure may, but need not, be a pressure of no more than about 0.1 pascals.

In embodiments, step (a) may comprise the sub-step of removing water from the filamentous fungal biomass.

In embodiments, step (a) may be carried out by agitating the filamentous fungal biomass together with the solution.

In embodiments, the filamentous fungal biomass may absorb or otherwise take up at least about 5 wt %, at least about 10 wt %, at least about 15 wt %, at least about 20 wt %, at least about 25 wt %, or at least about 30 wt % of the solution.

In embodiments, the solution may be an aqueous solution.

In embodiments, the solution may be a non-aqueous solution.

In another aspect of the present invention, a method for preparing a food product comprises (a) contacting a first filamentous fungal biomass, or portion thereof, with a first solution; (b) size-reducing the first filamentous fungal biomass, or portion thereof, to form a plurality of filamentous fungal pieces; (c) contacting a second filamentous fungal biomass, or portion thereof, with a second solution; (d) combining the plurality of filamentous fungal pieces and the second filamentous fungal biomass, or portion thereof and (e) treating the plurality of filamentous fungal pieces and the second filamentous fungal biomass, or portion thereof, to form the food product.

In embodiments, the food product may be a meat jerky analog food product.

In embodiments, at least one of the first and second solutions may comprise at least one of sodium chloride, a food seasoning, and an edible protein.

In embodiments, at least one of the following may be true: (i) a mass of the first solution is between about 1% and about 30% of a mass of the first filamentous fungal biomass, or portion thereof, prior to step (a); and (ii) a mass of the second solution is between about 1% and about 30% of a mass of the second filamentous fungal biomass, or portion thereof, prior to step (c).

In embodiments, at least one of step (a) and step (c) may be carried out under sub-atmospheric pressure. The sub-atmospheric pressure may, but need not, be a pressure of no more than about 0.1 pascals.

In embodiments, at least one of the following may be true: (i) step (a) comprises the sub-step of removing water from the first filamentous fungal biomass, or portion thereof; and (ii) step (c) comprises the sub-step of removing water from the second filamentous fungal biomass, or portion thereof.

In embodiments, at least one of the following may be true: (i) step (a) is carried out by agitating the first filamentous fungal biomass, or portion thereof, together with the first solution; and (ii) step (c) is carried out by agitating the second filamentous fungal biomass, or portion thereof, together with the second solution.

In embodiments, at least one of the following may be true: (i) the first filamentous fungal biomass, or portion thereof, absorbs or otherwise takes up at least about 5 wt %, at least about 10 wt %, at least about 15 wt %, at least about 20 wt %, at least about 25 wt %, or at least about 30 wt % of the first solution; and (ii) the second filamentous fungal biomass, or portion thereof, absorbs or otherwise takes up at least about 5 wt %, at least about 10 wt %, at least about 15 wt %, at least about 20 wt %, at least about 25 wt %, or at least about 30 wt % of the second solution.

In embodiments, at least one of the first and second solutions may be an aqueous solution.

In embodiments, at least one of the first and second solutions may be a non-aqueous solution.

In another aspect of the present invention, a meat jerky analog food product is made according to a method as described herein.

In embodiments, the meat jerky analog food product may have a water activity of between about 0.35 and about 0.85, or less than about 0.45.

In embodiments, the meat jerky analog food product may have a shelf life of at least about two weeks, at least about three weeks, at least about one month, at least about two months, at least about three months, at least about four months, at least about five months, at least about six months, at least about seven months, at least about eight months, at least about nine months, at least about ten months, at least about eleven months, at least about twelve months, at least about fifteen months, at least about eighteen months, at least about 21 months, or at least about 24 months.

In another aspect of the present invention, an intermediate food composition comprises a filamentous fungal biomass or a portion thereof; and a solution, absorbed or otherwise taken up by the filamentous fungal biomass or portion thereof.

In embodiments, the solution may comprise at least one of sodium chloride, a food seasoning, and an edible protein.

In embodiments, a mass of the solution may be between about 1% and about 30% of a mass of the filamentous fungal biomass or portion thereof.

In embodiments, the solution may be an aqueous solution.

In embodiments, the solution may be a non-aqueous solution.

In another aspect of the present invention, a method for preparing a food product comprises (a) contacting a filamentous fungal biomass with a solution comprising a food additive; (b) size-reducing the filamentous fungal biomass to form a plurality of filamentous fungal pieces; and (c) removing at least a portion of a solvent of the solution to treat the plurality of filamentous fungal pieces to form the food product comprising the filamentous fungal pieces and the food additive, wherein steps (a) and (b) are carried out simultaneously or sequentially in any order.

In embodiments, the food additive may comprise at least one of sodium chloride, a food seasoning, an edible protein, and a fibrous base material.

In embodiments, a mass of the solution may be between about 1% and about 30% of a total mass of the filamentous fungal biomass prior to contacting the solution.

In embodiments, step (a) may be carried out under sub-atmospheric pressure. The sub-atmospheric pressure may, but need not, be a pressure of no more than about 0.1 pascals.

In embodiments, step (a) may be carried out under super-atmospheric pressure.

In embodiments, step (a) may be carried out at a temperature below room temperature. The temperature below room temperature may, but need not, be no more than about 40° F.

In embodiments, during at least part of a duration of step (a), a temperature of the filamentous fungal biomass may be no more than about 34° F.

In embodiments, the method may further comprise, prior to step (a), removing water from the filamentous fungal biomass.

In embodiments, step (a) may comprise agitating the filamentous fungal biomass together with the solution.

In embodiments, the filamentous fungal biomass may absorb an amount of the solution equal to at least about 5 wt %, at least about 10 wt %, at least about 15 wt %, at least about 20 wt %, at least about 25 wt %, or at least about 30 wt % of the weight of the filamentous fungal biomass.

In embodiments, step (a) may comprise contacting at least two filamentous fungal biomasses with the solution, wherein the method further comprises, between steps (a) and (b), aggregating the at least two filamentous fungal biomasses to form a filamentous fungal aggregate, and wherein step (b) comprises size-reducing the filamentous fungal aggregate. The step of aggregating may, but need not, comprise encasing the at least two filamentous fungal biomasses in a casing. The aggregating step may, but need not, be carried out under sub-atmospheric pressure, which may, but need not, be a pressure of no more than about 0.1 pascals. The aggregating step may, but need not, comprise crust-freezing the at least two filamentous fungal biomasses.

In embodiments, the method may further comprise, between steps (a) and (b), crust freezing the filamentous fungal biomass. An internal temperature of the filamentous fungal biomass after the crust freezing step may, but need not, be between about 25° F. and about 27° F. The crust freezing step may, but need not, be carried out by placing the filamentous fungal biomass in a blast freezer.

In embodiments, step (b) may comprise at least one of cutting, shredding, and shaving the filamentous fungal biomass. The plurality of filamentous fungal pieces may, but need not, comprise at least one of strips, shreds, and shavings of the filamentous fungal biomass.

In embodiments, at least one of an average length, an average width, and an average depth of the plurality of filamentous fungal pieces may be between about 0.5 mm and about 1.0 mm.

In embodiments, step (c) may comprise at least one of roasting the plurality of filamentous fungal pieces, baking the plurality of filamentous fungal pieces, boiling the plurality of filamentous fungal pieces, frying the plurality of filamentous fungal pieces, steaming the plurality of filamentous fungal pieces, cold-smoking the plurality of filamentous fungal pieces, and hot-smoking the plurality of filamentous fungal pieces.

In embodiments, the solution may be an aqueous solution.

In embodiments, the solution may be a non-aqueous solution.

In embodiments, the method may further comprise, prior to step (a), forming the filamentous fungal biomass by a fermentation method comprising culturing a filamentous fungus in or on a fermentation medium or on a membrane associated with a fermentation medium; and inactivating the filamentous fungal biomass. The fermentation method may, but need not, be selected from the group consisting of a surface fermentation method, a submerged fermentation method, a membrane fermentation method, a solid-substrate fermentation method, and an air-medium colloid (AMC) fermentation method. The inactivating step may, but need not, be carried out by steaming the filamentous fungal biomass.

In embodiments, the food product may have a tensile strength of at least about 30 g/cm$^2$, at least about 40 g/cm$^2$, at least about 50 g/cm$^2$, at least about 60 g/cm$^2$, at least about 70 g/cm$^2$, at least about 80 g/cm$^2$, at least about 90 g/cm$^2$, at least about 100 g/cm$^2$, at least about 150 g/cm$^2$, at least about 200 g/cm$^2$, at least about 250 g/cm$^2$, at least about 300 g/cm$^2$, at least about 350 g/cm$^2$, at least about 400 g/cm$^2$, at least about 450 g/cm$^2$, at least about 500 g/cm$^2$, at least about 550 g/cm$^2$, at least about 600 g/cm$^2$, at least about 650 g/cm$^2$, at least about 700 g/cm$^2$, at least about 750 g/cm$^2$, at least about 800 g/cm$^2$, at least about 850 g/cm$^2$, at least about 900 g/cm$^2$, at least about 950 g/cm$^2$, at least about 1000 g/cm$^2$, at least about 1500 g/cm$^2$, at least about 2000 g/cm$^2$, at least about 2500 g/cm$^2$, at least about 3000 g/cm$^2$, at least about 3500 g/cm$^2$, or at least about 4000 g/cm$^2$.

In embodiments, the food product may comprise all essential amino acids.

In embodiments, the food product may comprise at least one amino acid selected from the group consisting of alanine, cysteine, aspartic acid, glutamic acid, glycine, asparagine, proline, glutamine, arginine, serine, selenocysteine, and tyrosine.

In embodiments, the food product may comprise at least about 10 wt %, at least about 15 wt %, at least about 20 wt %, at least about 25 wt %, or at least about 30 wt % branched-chain amino acids.

In embodiments, the food product may have a total fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %.

In embodiments, the filamentous fungal biomass may comprise at least about 6 wt %, at least about 7 wt %, at least about 8 wt %, at least about 9 wt %, or at least about 10 wt % dietary fiber on a dry weight basis.

In embodiments, the food product may have a dietary fiber content of at least about 1 gram, at least about 2 grams, at least about 3 grams, at least about 4 grams, at least about 5 grams, at least about 6 grams, at least about 7 grams, at least about 8 grams, at least about 9 grams, at least about 10 grams, at least about 11 grams, at least about 12 grams, at least about 13 grams, or at least about 14 grams of dietary fiber per 28 grams of food composition.

In embodiments, the filamentous fungal biomass may comprise a filamentous fungal biomat or portion thereof.

In embodiments, the food product may have a total protein content from about 10 wt % to about 25 wt %.

In another aspect of the present invention, a meat analog food product is made according to a method as described herein.

In another aspect of the present invention, a method for preparing a food product comprises (a) contacting a filamentous fungal biomass with a solution comprising a food additive; and (b) dehydrating the filamentous fungal biomass to form the food product comprising the filamentous fungal biomass and the food additive dispersed within the filamentous fungal biomass.

In embodiments, the food product may be a meat jerky analog food product.

In embodiments, the solution may comprise at least one of sodium chloride, a food seasoning, an edible protein, and a fibrous base material.

In embodiments, a mass of the solution may be between about 1% and about 30% of a mass of the filamentous fungal biomass prior to contacting the solution.

In embodiments, step (a) may be carried out under sub-atmospheric pressure. The sub-atmospheric pressure may, but need not, be a pressure of no more than about 0.1 pascals.

In embodiments, step (a) may be carried out at a temperature below room temperature. The temperature below room temperature may, but need not, be no more than about 40° F.

In embodiments, step (a) may be carried out at a temperature above room temperature.

In embodiments, during at least part of a duration of step (a), a temperature of the filamentous fungal biomass may be no more than about 34° F.

In embodiments, the method may further comprise, prior to step (a), removing water from the filamentous fungal biomass.

In embodiments, step (a) may be carried out by agitating the filamentous fungal biomass together with the solution.

In embodiments, the filamentous fungal biomass may absorb at least about 5 wt %, at least about 10 wt %, at least about 15 wt %, at least about 20 wt %, at least about 25 wt %, or at least about 30 wt % of the solution.

In embodiments, the solution may be an aqueous solution.

In embodiments, the solution may be a non-aqueous solution.

In embodiments, the method may further comprise, prior to step (a), forming the filamentous fungal biomass by a fermentation method comprising culturing a filamentous fungus in a fermentation medium; and inactivating the filamentous fungal biomass. The fermentation method may, but need not, be a surface fermentation method. The inactivating step may, but need not, be carried out by steaming the filamentous fungal biomass.

In embodiments, the food product may have a tensile strength of at least about 30 g/cm$^2$, at least about 40 g/cm$^2$, at least about 50 g/cm$^2$, at least about 60 g/cm$^2$, at least about 70 g/cm$^2$, at least about 80 g/cm$^2$, at least about 90 g/cm$^2$, at least about 100 g/cm$^2$, at least about 150 g/cm$^2$, at least about 200 g/cm$^2$, at least about 250 g/cm$^2$, at least about 300 g/cm$^2$, at least about 350 g/cm$^2$, at least about 400 g/cm$^2$, at least about 450 g/cm$^2$, at least about 500 g/cm$^2$, at least about 550 g/cm$^2$, at least about 600 g/cm$^2$, at least about 650 g/cm$^2$, at least about 700 g/cm$^2$, at least about 750 g/cm$^2$, at least about 800 g/cm$^2$, at least about 850 g/cm$^2$, at least about 900 g/cm$^2$, at least about 950 g/cm$^2$, at least about 1000 g/cm$^2$, at least about 1500 g/cm$^2$, at least about 2000 g/cm$^2$, at least about 2500 g/cm$^2$, at least about 3000 g/cm$^2$, at least about 3500 g/cm$^2$, or at least about 4000 g/cm$^2$.

In embodiments, the food product may comprise all nine essential amino acids.

In embodiments, the food product may comprise at least one amino acid selected from the group consisting of alanine, cysteine, aspartic acid, glutamic acid, glycine, asparagine, proline, glutamine, arginine, serine, selenocysteine, and tyrosine.

In embodiments, the food product may comprise at least about 10 wt %, at least about 15 wt %, at least about 20 wt %, at least about 25 wt %, or at least about 30 wt % branched-chain amino acids.

In embodiments, the food product may have a total fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %.

In embodiments, the filamentous fungal biomass may comprise at least about 6 wt %, at least about 7 wt %, at least about 8 wt %, at least about 9 wt %, or at least about 10 wt % dietary fiber on a dry weight basis.

In embodiments, the food product may have a dietary fiber content of at least about 1 gram, at least about 2 grams, at least about 3 grams, at least about 4 grams, at least about 5 grams, at least about 6 grams, at least about 7 grams, at least about 8 grams, at least about 9 grams, at least about 10 grams, at least about 11 grams, at least about 12 grams, at least about 13 grams, or at least about 14 grams of dietary fiber per 28 grams of food composition.

In embodiments, the filamentous fungal biomass may comprise a filamentous fungal biomat or a portion thereof.

In embodiments, the food product may have a total protein content from about 10 wt % to about 25 wt %.

In another aspect of the present invention, a meat jerky analog food product is made according to a method as disclosed herein.

In another aspect of the present invention, a meat analog food product comprises filamentous fungus, wherein the meat analog food product has a shelf life of at least about two weeks and wherein at least one of the following is true: (i) the meat analog food product comprises less than about 200 milligrams of sodium per 28 grams of food product; (ii) the meat analog food product comprises no more than 15 grams of sugar per 28 grams of food product; and (iii) a sugar content of the meat analog food product is no more than about 10 wt %.

In embodiments, the meat analog food product may have a shelf life of at least about three weeks, at least about one month, at least about two months, at least about three months, at least about four months, at least about five months, at least about six months, at least about seven months, at least about eight months, at least about nine months, at least about ten months, at least about eleven months, at least about twelve months, at least about fifteen months, at least about eighteen months, at least about 21 months, or at least about 24 months.

In embodiments, the meat analog food product may have a water activity of between about 0.35 and about 0.85.

In embodiments, the meat analog food product may have a water activity of no more than about 0.45.

In embodiments, the meat analog food product may comprise less than about 190 milligrams, less than about 180 milligrams, less than about 170 milligrams, less than about 160 milligrams, less than about 150 milligrams, less than about 140 milligrams, less than about 130 milligrams, less than about 120 milligrams, less than about 110 milligrams, or less than about 100 milligrams of sodium per 28 grams of food product.

In embodiments, at least one of the following may be true: (i) the meat analog food product comprises no more than 14 grams, no more than 13 grams, no more than 12 grams, no more than 11 grams, no more than 10 grams, no more than 9 grams, no more than 8 grams, no more than 7 grams, no more than 6 grams, no more than 5 grams, no more than 4 grams, no more than 3 grams, no more than 2 grams, or no more than 1 gram of sugar per 28 grams of food product; and (ii) a sugar content of the meat analog food product is no more than about 9 wt %, no more than about 8 wt %, no more than about 7 wt %, no more than about 6 wt %, no more than about 5 wt %, no more than about 4 wt %, no more than about 3 wt %, no more than about 2 wt %, or no more than about 1 wt %.

In embodiments, the food product may have a tensile strength of at least about 30 g/cm², at least about 40 g/cm², at least about 50 g/cm², at least about 60 g/cm², at least about 70 g/cm², at least about 80 g/cm², at least about 90 g/cm², at least about 100 g/cm², at least about 150 g/cm², at least about 200 g/cm², at least about 250 g/cm², at least about 300 g/cm², at least about 350 g/cm², at least about 400 g/cm², at least about 450 g/cm², at least about 500 g/cm², at least about 550 g/cm², at least about 600 g/cm², at least about 650 g/cm², at least about 700 g/cm², at least about 750 g/cm², at least about 800 g/cm², at least about 850 g/cm², at least about 900 g/cm², at least about 950 g/cm², at least about 1000 g/cm², at least about 1500 g/cm², at least about 2000 g/cm², at least about 2500 g/cm², at least about 3000 g/cm², at least about 3500 g/cm², or at least about 4000 g/cm².

In embodiments, the meat analog food product may comprise all nine essential amino acids.

In embodiments, the meat analog food product may comprise at least one amino acid selected from the group consisting of alanine, cysteine, aspartic acid, glutamic acid, glycine, asparagine, proline, glutamine, arginine, serine, selenocysteine, and tyrosine.

In embodiments, the meat analog food product may comprise at least about 10 wt %, at least about 15 wt %, at least about 20 wt %, at least about 25 wt %, or at least about 30 wt % branched-chain amino acids.

In embodiments, the meat analog food product may have a total fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %.

In embodiments, the filamentous fungal biomass may comprise at least about 6 wt %, at least about 7 wt %, at least about 8 wt %, at least about 9 wt %, or at least about 10 wt % dietary fiber on a dry weight basis.

In embodiments, the meat analog food product may have a dietary fiber content of at least about 1 gram, at least about 2 grams, at least about 3 grams, at least about 4 grams, at least about 5 grams, at least about 6 grams, at least about 7 grams, at least about 8 grams, at least about 9 grams, at least about 10 grams, at least about 11 grams, at least about 12 grams, at least about 13 grams, or at least about 14 grams of dietary fiber per 28 grams of food composition.

In embodiments, the filamentous fungal biomass may comprise a filamentous fungal biomat or a portion thereof.

In embodiments, the meat analog food product may have a total protein content from about 10 wt % to about 25 wt %.

In another aspect of the present invention, a method for preparing a food product comprises (a) contacting a first filamentous fungal biomass with a first solution; (b) size-reducing the first filamentous fungal biomass to form a plurality of filamentous fungal pieces; (c) contacting a second filamentous fungal biomass with a second solution; (d) combining the plurality of filamentous fungal pieces and the second filamentous fungal biomass; and (e) treating the plurality of filamentous fungal pieces and the second filamentous fungal biomass to form the food product.

In embodiments, the food product may be a meat jerky analog food product.

In embodiments, at least one of the first and second solutions may comprise at least one of sodium chloride, a food seasoning, an edible protein, and a fibrous base material.

In embodiments, at least one of the following may be true: (i) a mass of the first solution is between about 1% and about 30% of a mass of the first filamentous fungal biomass prior to step (a); and (ii) a mass of the second solution is between about 1% and about 30% of a mass of the second filamentous fungal biomass prior to step (c).

In embodiments, at least one of step (a) and step (c) is carried out under sub-atmospheric pressure. The sub-atmospheric pressure may, but need not, be a pressure of no more than about 0.1 pascals.

In embodiments, at least one of step (a) and step (c) may be carried out at a temperature below room temperature. The temperature below room temperature may, but need not, be no more than about 40° F. During at least part of a duration of step (a), a temperature of at least one of the first filamentous fungal biomass and the second filamentous fungal biomass may, but need not, be no more than about 34° F.

In embodiments, at least one of step (a) and step (c) may be carried out at a temperature above room temperature.

In embodiments, the method may further comprise at least one of: (i) prior to step (a), removing water from the first filamentous fungal biomass; and (ii) prior to step (c), removing water from the second filamentous fungal biomass.

In embodiments, at least one of the following may be true: (i) step (a) is carried out by agitating the first filamentous fungal biomass together with the first solution; and (ii) step (c) is carried out by agitating the second filamentous fungal biomass together with the second solution.

In embodiments, at least one of the following may be true: (i) the first filamentous fungal biomass absorbs at least about 5 wt %, at least about 10 wt %, at least about 15 wt %, at least about 20 wt %, at least about 25 wt %, or at least about 30 wt % of the first solution; and (ii) the second filamentous fungal biomass absorbs least about 5 wt %, at least about 10 wt %, at least about 15 wt %, at least about 20 wt %, at least about 25 wt %, or at least about 30 wt % of the second solution.

In embodiments, the method may further comprise at least one of (i) between steps (a) and (b), crust freezing the first filamentous fungal biomass, and (ii) between steps (c) and (d), crust freezing the second filamentous fungal biomass. An internal temperature of the first filamentous fungal biomass when (i) is true, or an internal temperature of the second filamentous fungal biomass when (ii) is true, after the crust freezing step may, but need not, be between about 25° F. and about 27° F. The crust freezing step may, but need not, be carried out by placing the filamentous fungal biomass in a blast freezer.

In embodiments, at least one of the first and second solutions may be an aqueous solution.

In embodiments, at least one of the first and second solutions may be a non-aqueous solution.

In embodiments, the method may further comprise, prior to at least one of steps (a) and (c), forming at least one of the filamentous fungal biomass and the second filamentous fungal biomass by a fermentation method comprising culturing a filamentous fungus in a fermentation medium; and inactivating the at least one of the first filamentous fungal biomass and the second filamentous fungal biomass. The fermentation method may, but need not, be a surface fermentation method.

The inactivating step may, but need not, be carried out by at least one of dehydrating the filamentous fungal biomass, freezing the filamentous fungal biomass, pressure treating the filamentous fungal biomass, rinsing the filamentous fungal biomass, size reducing the filamentous fungal biomass, steaming the filamentous fungal biomass, and temperature cycling the filamentous fungal biomass.

In embodiments, the food product may have a tensile strength of at least about 30 g/cm², at least about 40 g/cm², at least about 50 g/cm², at least about 60 g/cm², at least about 70 g/cm², at least about 80 g/cm², at least about 90 g/cm², at least about 100 g/cm², at least about 150 g/cm², at least about 200 g/cm², at least about 250 g/cm², at least about 300 g/cm², at least about 350 g/cm², at least about 400 g/cm², at least about 450 g/cm², at least about 500 g/cm², at least about 550 g/cm², at least about 600 g/cm², at least about 650 g/cm², at least about 700 g/cm², at least about 750 g/cm², at least about 800 g/cm², at least about 850 g/cm², at least about 900 g/cm², at least about 950 g/cm², at least about 1000 g/cm², at least about 1500 g/cm², at least about 2000 g/cm², at least about 2500 g/cm², at least about 3000 g/cm², at least about 3500 g/cm², or at least about 4000 g/cm².

In embodiments, the food product may comprise all nine essential amino acids.

In embodiments, the food product may comprise at least one amino acid selected from the group consisting of alanine, cysteine, aspartic acid, glutamic acid, glycine, asparagine, proline, glutamine, arginine, serine, selenocysteine, and tyrosine.

In embodiments, the food product may comprise at least about 10 wt %, at least about 15 wt %, at least about 20 wt %, at least about 25 wt %, or at least about 30 wt % branched-chain amino acids.

In embodiments, the food product may have a total fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %.

In embodiments, at least one of the filamentous fungal biomass and the second filamentous fungal biomass may comprise at least about 6 wt %, at least about 7 wt %, at least about 8 wt %, at least about 9 wt %, or at least about 10 wt % dietary fiber on a dry weight basis.

In embodiments, the food product may have a dietary fiber content of at least about 1 gram, at least about 2 grams, at least about 3 grams, at least about 4 grams, at least about 5 grams, at least about 6 grams, at least about 7 grams, at least about 8 grams, at least about 9 grams, at least about 10 grams, at least about 11 grams, at least about 12 grams, at least about 13 grams, or at least about 14 grams of dietary fiber per 28 grams of food composition.

In embodiments, at least one of the first filamentous fungal biomass and the second filamentous fungal biomass may comprise a filamentous fungal biomat or a portion thereof.

In embodiments, the food product may have a total protein content from about 10 wt % to about 25 wt %.

In another aspect of the present invention, a meat jerky analog food product is made according to a method as disclosed herein.

In another aspect of the present invention, an intermediate food composition comprises a filamentous fungal biomass; and a solution comprising a food additive, absorbed by the filamentous fungal biomass.

In embodiments, the solution may comprise at least one of sodium chloride, a food seasoning, an edible protein, and a fibrous base material.

In embodiments, a mass of the solution may be between about 1% and about 30% of a mass of the filamentous fungal biomass.

In embodiments, the solution may be an aqueous solution.

In embodiments, the solution may be a non-aqueous solution.

In embodiments, the filamentous fungal biomass may be derived from a fermentation method selected from the group consisting of a surface fermentation method, a submerged fermentation method, a membrane fermentation method, a solid-substrate fermentation method, an air-medium colloid (AMC) fermentation method, and combinations thereof.

In embodiments, the filamentous fungal biomass is inactivated.

In embodiments, the filamentous fungal biomass may comprise a filamentous fungal biomat or a portion thereof.

In another aspect of the present invention, a method for preparing a food product comprises (a) vacuum-shaping a filamentous fungal biomass, wherein the filamentous fungal biomass comprises a solution comprising a food additive; (b) size-reducing the vacuum-shaped filamentous fungal biomass to form a plurality of filamentous fungal pieces; and (c) removing at least a portion of a solvent of the solution to treat the plurality of filamentous fungal pieces to form the food product comprising the filamentous fungal pieces and the food additive.

In embodiments, in step (a), the filamentous fungal biomass may be exposed to an absolute pressure of no more than about 0.1 pascals.

In embodiments, following step (a), the filamentous fungal biomass may have an approximately cylindrical shape.

In embodiments, the method may further comprise, between steps (a) and (b), crust freezing the filamentous fungal biomass. An internal temperature of the filamentous fungal biomass after the crust freezing step may, but need not, be between about 25° F. and about 27° F. The crust freezing step may, but need not, be carried out by placing the filamentous fungal biomass in a blast freezer.

In embodiments, step (b) may comprise at least one of cutting, shredding, and shaving the filamentous fungal biomass. The plurality of filamentous fungal pieces may, but need not, comprise at least one of strips, shreds, and shavings of the filamentous fungal biomass.

In embodiments, at least one of an average length, an average width, and an average depth of the plurality of filamentous fungal pieces may be between about 0.5 mm and about 1.0 mm.

In embodiments, the method may further comprise, prior to step (a), forming the filamentous fungal biomass by a fermentation method comprising culturing a filamentous fungus in a fermentation medium; and inactivating the filamentous fungal biomass. The fermentation method may, but need not, be a surface fermentation method. The inactivating step may, but need not, be carried out by steaming the filamentous fungal biomass.

In embodiments, the food product may have a tensile strength of at least about 30 g/cm², at least about 40 g/cm², at least about 50 g/cm², at least about 60 g/cm², at least about 70 g/cm², at least about 80 g/cm², at least about 90 g/cm², at least about 100 g/cm², at least about 150 g/cm², at least about 200 g/cm², at least about 250 g/cm², at least about 300 g/cm², at least about 350 g/cm², at least about 400 g/cm², at least about 450 g/cm², at least about 500 g/cm², at least about 550 g/cm², at least about 600 g/cm², at least about 650 g/cm², at least about 700 g/cm², at least about 750 g/cm², at least about 800 g/cm², at least about 850 g/cm², at least about 900 g/cm², at least about 950 g/cm², at least about 1000 g/cm², at least about 1500 g/cm², at least about 2000 g/cm², at least about 2500 g/cm², at least about 3000 g/cm², at least about 3500 g/cm², or at least about 4000 g/cm².

In embodiments, the food product may comprise all nine essential amino acids.

In embodiments, the food product may comprise at least one amino acid selected from the group consisting of alanine, cysteine, aspartic acid, glutamic acid, glycine, asparagine, proline, glutamine, arginine, serine, selenocysteine, and tyrosine.

In embodiments, the food product may comprise at least about 10 wt %, at least about 15 wt %, at least about 20 wt %, at least about 25 wt %, or at least about 30 wt % branched-chain amino acids.

In embodiments, the food product may have a total fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %.

In embodiments, the filamentous fungal biomass may comprise at least about 6 wt %, at least about 7 wt %, at least about 8 wt %, at least about 9 wt %, or at least about 10 wt % dietary fiber on a dry weight basis.

In embodiments, the food product may have a dietary fiber content of at least about 1 gram, at least about 2 grams, at least about 3 grams, at least about 4 grams, at least about 5 grams, at least about 6 grams, at least about 7 grams, at least about 8 grams, at least about 9 grams, at least about 10 grams, at least about 11 grams, at least about 12 grams, at least about 13 grams, or at least about 14 grams of dietary fiber per 28 grams of food composition.

In embodiments, the filamentous fungal biomass may comprise a filamentous fungal biomat or a portion thereof.

In embodiments, the food product may have a total protein content from about 10 wt % to about 25 wt %.

The advantages of the present invention will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As used herein, unless otherwise specified, the terms "about," "approximately," etc., when used in relation to numerical limitations or ranges, mean that the recited limitation or range may vary by up to 10%. By way of non-limiting example, "about 750" can mean as little as 675 or as much as 825, or any value therebetween. When used in relation to ratios or relationships between two or more numerical limitations or ranges, the terms "about," "approximately," etc. mean that each of the limitations or ranges may vary by up to 10%; by way of non-limiting example, a statement that two quantities are "approximately equal" can mean that a ratio between the two quantities is as little as 0.9:1.1 or as much as 1.1:0.9 (or any value therebetween), and a statement that a four-way ratio is "about 5:3:1:1" can mean that the first number in the ratio can be any value of at least 4.5 and no more than 5.5, the second number in the ratio can be any value of at least 2.7 and no more than 3.3, and so on.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Figure 1A:
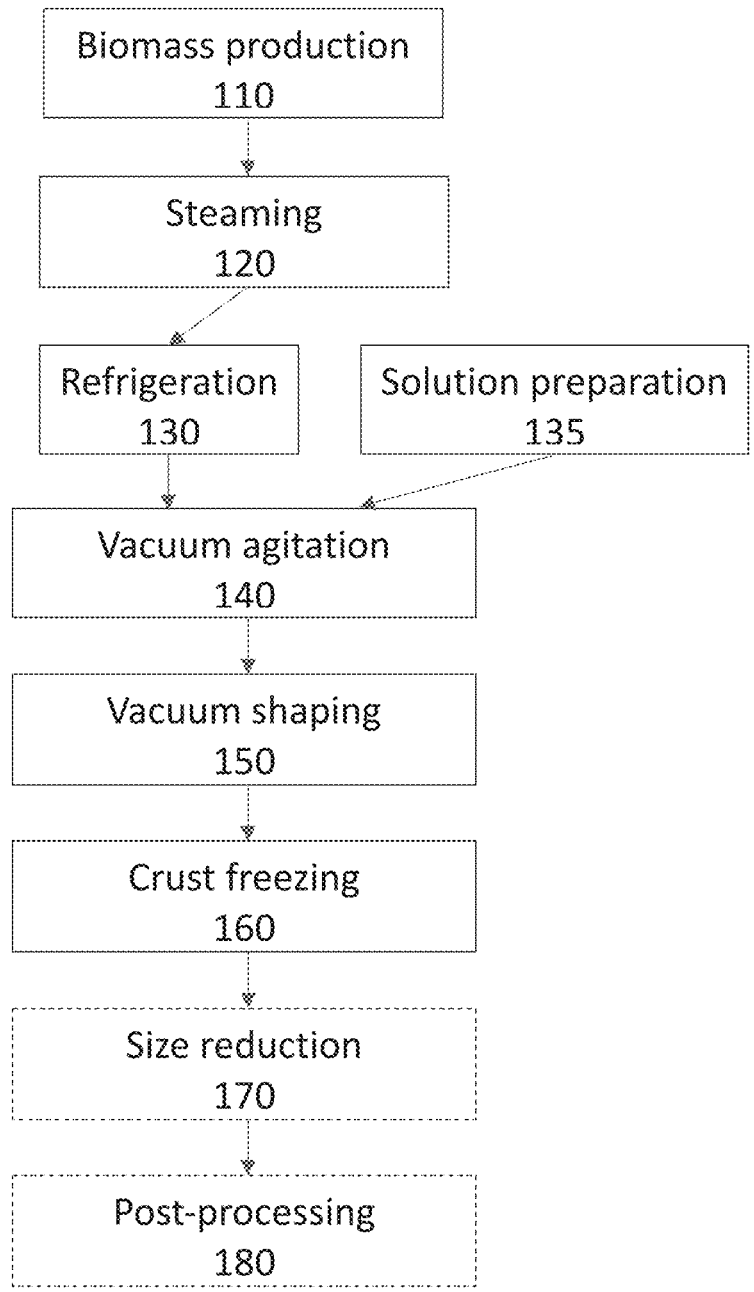
FIGS. 1A and 1B are flowcharts depicting embodiments of a method for processing filamentous fungal material into a food product or material for use in a food product, according to embodiments of the present disclosure.

Unless defined otherwise, all technical and scientific terms used herein have the same meaning as is commonly understood by one of ordinary skill in the art. If there is a plurality of definitions for a term herein, the definition provided in the Summary of the Invention prevails unless otherwise stated.

As used herein, unless otherwise specified, the term "analog" or "analog food product" refers to a food product comprising edible fungi that bears an aesthetic, culinary, nutritional, and/or sensory equivalence or resemblance to an identified non-fungal food product. By way of non-limiting example, a "meat analog food product," as that term is used herein, refers to a food product comprising edible fungi that bears an aesthetic, culinary, nutritional, and/or sensory equivalence or resemblance to animal meat, and a "jerky food analog product," as that term is used herein, refers to a food product comprising edible fungi that bears an aesthetic, culinary, nutritional, and/or sensory equivalence or resemblance to conventional jerky made from animal meats.

As used herein, the term "biomass," unless otherwise specified, refers to a mass of a living or formerly living organism. By way of non-limiting example, the phrase "filamentous fungal biomass" as used herein refers to a mass of a living or formerly living filamentous fungus.

Filamentous fungal biomasses may include biomats (as that term is used herein), as well as filamentous fungus produced by submerged fermentation, such as (but not limited to) a mycoprotein paste as described in U.S. Pat. No. 7,635,492 to Finnigan et al.

As used herein, the term "biomat," unless otherwise specified, refers to a cohesive mass of filamentous fungal tissue comprising a network of interwoven hyphae filaments. Biomats as that term is used herein may, but need not, be characterized by one or more of a density of between about 50 and about 200 grams per liter, a solids content of between about 5 wt % and about 20 wt %, and sufficient tensile strength to be lifted substantially intact from the surface of a growth substrate (e.g., a liquid growth medium, a solid fungal composite, or a solid membrane or mesh). Biomats, as that term is used herein, may be produced by any one or more fungal fermentation methods known in the art, such as, by way of non-limiting example, methods described in PCT Application Publications 2020/176758, 2019/099474, and 2018/014004.

As used herein, unless otherwise specified, the term "free water" refers to water molecules within a mass of material that are not chemically or physically hindered from being removed from the mass of material.

As used herein, unless otherwise specified, the term "inactivated" refers to a filamentous fungal biomass in which the fungal cells have been rendered nonviable, or enzymes capable of degrading or causing biochemical transformations within the biomass have been deactivated, or both. By extension, the term "inactivation" refers to any method or process by which a filamentous fungal biomass may be inactivated, such as, by way of non-limiting example, dehydration, freezing, pressure treatment, rinsing, size reduction, steaming, and temperature cycling.

As used herein, unless otherwise specified, the term "physically bound water" refers to water molecules within a mass of material that are in physical contact with molecules of the material but are not chemically bound to the material.

As used herein, unless otherwise specified, the term "tightly bound water" refers to water molecules within a mass of material that are chemically bound by intermolecular forces, e.g. hydrogen bonding, ionic bonding, ion-dipole forces, van der Waals forces, etc., to molecules of the material.

As used herein, unless otherwise specified, the term "vegan" refers to a food product that is substantially free of food components or ingredients, such as protein, derived from animals. Specific examples of non-vegan food ingredients or products include blood, eggs, isinglass, meat (and components thereof, e.g. animal proteins or fats), milk, rennet, and foods made using any one or more of these ingredients (e.g. ice cream, mayonnaise, etc.). As disclosed herein, some vegan food products may be analogs of non-vegan food products.

As used herein, unless otherwise specified, the term "vegetarian" refers to a food product that is substantially free of meat and components thereof. "Vegetarian" food products, as that term is used herein, may (but need not) include food components or ingredients other than meat that are derived from animals (e.g. eggs, milk, etc.). Thus, as the terms are used herein, all "vegan" food products are "vegetarian," but not all "vegetarian" food products are necessarily "vegan."

Embodiments of the present invention include compositions comprising filamentous fungi, typically compositions comprising edible filamentous fungi, and most typically filamentous fungal food compositions, i.e. edible filamentous fungal compositions that are adapted for consumption by humans or domesticated, farmed (e.g. agriculture or aquaculture), or livestock animals, that include filamentous fungal biomass. In some embodiments, the filamentous fungal food composition may be a food product that is analogous to a conventional or known food product comprising meat or another animal-derived ingredient, wherein the filamentous fungal biomass is provided in addition to or in lieu of the animal-derived ingredient. In embodiments, the filamentous fungal food composition of the present invention may be an analog of a meat product, such as, by way of non-limiting example, whole cuts of meat, ground meat (and products formed therefrom, e.g. meatballs), meatloaves, burger patties, shredded meat, jerky, and so on.

Embodiments of the present invention include food products prepared from a food composition comprising filamentous fungal biomass and a solution, commonly but not always an aqueous solution, comprising one or more food additives, such as, by way of non-limiting examples, salt, flavorings, vitamins, and nutritional components (e.g. carbohydrates, fats, proteins, etc.), in which the solution comprises about 5 wt %, about 10 wt %, about 15 wt %, about 20 wt %, about 25 wt %, about 30 wt %, about 35 wt %, about 40 wt %, about 45 wt %, or about 50 wt %, or alternatively in any range between 5 wt % and 50 wt %, or in any range from any whole number percentage by weight between 5 wt % and 50 wt % to any other whole number percentage by weight between 5 wt % and 50 wt % of the total food composition. One significant advantage and benefit of the present invention is that the filamentous fungal biomass present in the food compositions of the invention may have significantly greater ability to absorb or otherwise take up a solution, e.g. a "marinade" or similar solution applied to the fungal biomass to achieve a seasoning, flavoring, and/or nutritional objective and/or to define a textural property (e.g. chewiness, elasticity, mechanical behavior characteristics such as tendency to rip or tear, etc.), than conventional meat ingredients; without wishing to be bound by any theory, the present inventors hypothesize that this effect is due to differences between the mycelial structure of a filamentous fungal biomat and the myofibrillar structure of meat, in that the mycelial structure is more amenable to changes in the ratio of bound water to unbound water (and thus to reabsorption of the marinade) than meat. Because the filamentous fungal biomass itself may have a moisture content of as much as 80 wt %, higher than most whole cuts of meat, even before a solution is applied thereto, the water content of food compositions, and particularly meat analog food products, of the invention may be advantageously high. Embodiments of the present invention further include methods of forming a food composition comprising filamentous fungal biomass and a solution as described above (e.g. by contacting filamentous fungal biomass with the solution and allowing the filamentous fungal biomass to absorb or otherwise take up the solution), and food compositions made by such methods. It is to be expressly understood that "food compositions," as that term is used herein unless otherwise specified, of the present invention may be "final" food compositions (i.e. compositions that are intended to be consumed by a human or a domesticated, farmed, or livestock animal without further processing) or "intermediate" food compositions (i.e. compositions that are intended to be further processed and consumed by a human or a domesticated, farmed, or livestock animal only after further processing). Processing steps by which "intermediate" food compositions may become "final" food compositions according to the present invention include, but are by no means limited to, dehydration.

In embodiments, the filamentous fungal biomass may have a moisture content of at least about 50 wt %, at least about 55 wt %, at least about 60 wt %, at least about 65 wt %, at least about 70 wt %, or at least about 75 wt %. In some embodiments, very little or none of the moisture present in the filamentous fungal biomass may be free water, or, in other words, the filamentous fungal biomass may have a total content of physically bound water and tightly bound water of at least about 50 wt %, at least about 55 wt %, at least about 60 wt %, at least about 65 wt %, at least about 70 wt %, or at least about 75 wt %. Without wishing to be bound by any particular theory, it is believed that the ability of the filamentous fungal food compositions of the invention to absorb or otherwise take up a solution is related primarily to the content of physically bound and tightly bound water and not necessarily to the total moisture content; particularly, free water may be more easily removed during dehydration and replaced by a marinade or other liquid solution than bound water Thus, even high-moisture filamentous fungal biomass may suitably be used in filamentous fungal food compositions of the invention and may absorb or take up a solution in significant quantities, so long as the proportion of moisture that is present as free water is relatively low. In some embodiments, therefore, methods of the present disclosure may include a step of treating a filamentous fungal biomass to remove at least a portion of the free water therefrom to increase the biomass' capacity for taking up a liquid solution in a subsequent treatment step; such a step may result in a longer shelf life for the resulting food product, as the present inventors hypothesize, without wishing to be bound by any particular theory, that shelf life correlates with the proportion of moisture initially present as bound water due to stabilization within the hyphal structure.

One particular advantage and benefit of the methods and compositions of the present invention is that food compositions according to the invention may have advantageously high shelf stability, or, in other words, an advantageously long shelf life, especially as compared to conventional food products to which the filamentous fungal food compositions may be analogous (e.g. meat products), while reducing, or in some embodiments even eliminating, the use of preservatives, stabilizers, and/or mold inhibitors (e.g., potassium sorbate) that may adversely affect the aesthetic or nutritional properties of the food product; in some embodiments, the food product may be substantially free of preservatives, stabilizers, and/or mold inhibitors (i.e., a component added to a food product that, in the quantity added, can materially affect the shelf life of the product), and/or methods for making the food product may not include any step of adding a preservative, stabilizer, and/or mold inhibitor. Without wishing to be bound by any particular theory, this advantage and benefit may be, in at least some embodiments, a result of either or both of (1) control over the moisture content of the filamentous fungal biomass enabled by the methods of the invention, particularly, the ability to remove as much or as little of the free water within the filamentous fungal biomass (and optionally to replace the removed free water with other chemistries) as desired, and (2) inactivation of enzymes and secondary metabolites in the filamentous fungal biomass. By way of non-limiting example, conventional meat jerky products are extremely shelf-stable and may, under ambient conditions, have a shelf life of many months, but achieve this stability only by including significant quantities of salt and/or sugar, which act as plasticizers and/or stabilizers for the jerky product. Additions of salt and sugar, however, have well-known nutritional drawbacks. The filamentous fungal food compositions of the present invention can overcome this drawback in any one of several ways, for example by substituting salt for sugar as a stabilizer (which may in embodiments result in a more acceptable nutritional profile), by using stabilizers in lesser amounts than analogous conventional food products, or by virtue of having a lower fat content (or other nutritional advantage) relative to true meat. In embodiments, food compositions of the present invention comprise filamentous fungal biomass and one or more food additives (e.g. salt, flavorings, vitamins, added carbohydrates, added fats, added proteins, etc.) and have a shelf life of at least about one week, at least about two weeks, at least about three weeks, at least about one month, at least about two months, at least about three months, at least about four months, at least about five months, at least about six months, at least about seven months, at least about eight months, at least about nine months, at least about ten months, at least about eleven months, at least about twelve months, at least about fifteen months, at least about eighteen months, at least about 21 months, or at least about 24 months. In addition or alternatively, such embodiments can include food compositions including no more than 15 grams, no more than 14 grams, no more than 13 grams, no more than 12 grams, no more than 11 grams, no more than 10 grams, no more than 9 grams, no more than 8 grams, no more than 7 grams, no more than 6 grams, no more than 5 grams, no more than 4 grams, no more than 3 grams, no more than 2 grams, or no more than 1 gram of sugar per 28 grams of food composition, and/or a sugar content of no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, or no more than about 1 wt %. Particularly, food compositions of the present invention may have an "elastic" or "chewy" consistency and texture, and/or a "juiciness" or perceived amount or extent of moisture, analogous to conventional meat jerky products, while still possessing both an advantageously long shelf life and an advantageously low sugar content. These advantageously long shelf lives may, in embodiments, be a consequence of a low water activity, e.g. a water activity of less than about 0.95, less than about 0.90, less than about 0.85, less than about 0.80, less than about 0.75, less than about 0.70, less than about 0.65, less than about 0.60, less than about 0.55, less than about 0.50, less than about 0.45, less than about 0.40, less than about 0.35, less than about 0.30, less than about 0.25, less than about 0.20, less than about 0.15, less than about 0.10, or less than about 0.05.

Another advantage and benefit of the filamentous fungal food compositions of the present invention is that the perceptibility of flavoring ingredients added to the filamentous fungal biomass may be enhanced relative to their perceptibility in both analogous conventional meat and dairy products and current vegan or vegetarian meat analog or dairy analog products. By way of non-limiting example, the present inventors have unexpectedly discovered that, when salt is added to filamentous fungal biomass to form a food composition of the present invention, the resulting food composition is subjectively much "saltier" (i.e. has a greater gustatory perception of salt flavor) than a conventional meat product containing the same concentration of salt. Without wishing to be bound by any particular theory, it is believed that this result may be due to a lower fat content in filamentous fungal biomass than in meat (as fat may dull the perceptibility of salt in a food product) and/or due to the inherently "mild" or "neutral" flavor of filamentous fungal biomass compared to many types of meat. Regardless of the mechanism, however, this advantageous result allows flavoring additives to be used in lower quantities in the food compositions of the present invention than in conventional food products to which they may be analogous. In embodiments, filamentous fungal food compositions of the present invention may have a perceived saltiness comparable to a conventional meat product while including less than about 200 milligrams, less than about 190 milligrams, less than about 180 milligrams, less than about 170 milligrams, less than about 160 milligrams, less than about 150 milligrams, less than about 140 milligrams, less than about 130 milligrams, less than about 120 milligrams, less than about 110 milligrams, or less than about 100 milligrams of sodium per serving.

Another advantage and benefit of the filamentous fungal food compositions of the present invention is that the perceptibility of flavors imparted to the food compositions due to a cooking or preparation process may be enhanced relative to their perceptibility in analogous conventional food products. By way of non-limiting example, the present inventors have unexpectedly discovered that, when filamentous fungal biomass is smoked to form a smoked food composition of the present invention, the resulting food composition is subjectively much "smokier" (i.e. has a greater gustatory perception of smoke flavor) than a conventional meat product smoked in the same way, which may allow for a given perception of "smokiness" or smoky flavor to be achieved with lower quantities of smoke and/or shorter smoking times. Without wishing to be bound by any particular theory, it is believed that this result may be a result of any one or more of (1) the use of porous filamentous fungal material, e.g. a filamentous fungal biomat, to allow molecules present in smoke, marinades, etc. to travel through the fungal material and adhere to surfaces thereof, and/or (2) the filamentous fungal biomass absorbing or otherwise taking up smoke or components thereof (e.g. phenols, such as syringol, guaiacol, and pyrocatechol, and alkyl derivatives thereof) during the smoking process, which may in turn be due to a lower water content in the filamentous fungal biomass (whether inherently or as a result of a drying/dehydration process prior to smoking) making the filamentous fungal biomass more amenable to absorption of hydrophobic compounds in smoke than high-moisture cuts of meat, and/or (3) the strong umami or savory flavor response of the filamentous fungus itself. It may also be the case that, because filamentous fungal biomass has a lower fat content than meat, molecules present in smoke, marinades, etc. that impart flavor may adhere to, become entrenched in, or otherwise become present in the food composition in different locations or by different mechanisms. Regardless of the mechanism, however, this advantageous result allows filamentous fungal biomass in the food compositions of the present invention to be smoked or otherwise prepared for shorter times, at lesser intensity, with lesser environmental impact, etc. than in conventional food products to which they may be analogous, and/or for the food compositions of the present invention to have an enhanced, heightened, or intensified flavor relative to identically prepared conventional meat products. Further, filamentous fungal food compositions of the present invention may have a subjectively "smoky" flavor even when a fat content (which contributes to smoky flavor) of the food composition is much lower than that of an analogous meat product. In embodiments, filamentous fungal food compositions of the present invention may have a perceived smokiness comparable to a conventional smoked meat product while having a fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %. By comparison, smoked pork generally has a fat content of about 15 wt %, and beef brisket generally has a fat content of about 33 wt %.

Another advantage and benefit of the filamentous fungal food compositions of the present invention is that the filamentous fungal biomass may be more readily processed into a desired physical form, and thus require a lower content, or may even allow the complete omission, of binders, fillers, or similar functional materials, compared to meat or other plant- or fungus-based meat analog materials. Particularly, the present inventors have demonstrated that filamentous fungal biomass produced according to the present invention can be repeatedly frozen, thawed, dehydrated, rehydrated, etc. (as may be desirable for particular applications), and may in either fresh or frozen form (or both) be amenable to pressing, molding, or otherwise shaping into a desired physical configuration without the addition of any binder. In embodiments, filamentous fungal food compositions of the present invention, and in embodiments, meat analog filamentous fungal food compositions, may comprise at least about 50 wt %, at least about 60 wt %, at least about 70 wt %, at least about 80 wt %, at least about 90 wt %, at least about 91 wt %, at least about 92 wt %, at least about 93 wt %, at least about 94 wt %, or at least about 95 wt % fungal biomass, and/or may comprise no more than about 10 wt %, no more than about 9 wt %, no more than about 8 wt %, no more than about 7 wt %, no more than about 6 wt %, or no more than about 5 wt % of binders and fillers (which include similar functional materials). In some embodiments, the filamentous fungal food compositions of the present invention are substantially free of binders and fillers. This feature may be particularly advantageous where the filamentous fungal food composition is a meat analog food product, in which the total content of ingredients other than fungal biomass must be minimized.

Filamentous fungal food compositions according to the present invention may comprise any one or more forms or types of filamentous fungal biomass. By way of non-limiting example, forms or types of filamentous fungal biomass suitable for use in the food compositions of the present invention include, but are not limited to, processed biomats, fungal paste formed from biomats, unprocessed or "raw" biomats, and combinations and mixtures of these. By way of further non-limiting example, filamentous fungal biomass suitable for use in the food compositions of the present invention may be produced, instead of or in addition to surface fermentation processes that yield fungal biomats, any one or more other methods, e.g. a submerged fermentation process yielding a fungal paste, etc.; in some embodiments, it is also possible to combine forms or types of filamentous fungal biomass produced by two or more different processes, e.g. any two or more of a liquid surface fermentation process, a solid surface fermentation process, an air-medium colloid fermentation process, a submerged fermentation process, etc. The ability to incorporate any of several forms or types of filamentous fungal biomass is therefore another advantage and benefit of the compositions and methods of the present invention.

Filamentous fungal food compositions according to the present invention may, in embodiments, comprise a highly dense fungal biomass, and in some embodiments a highly dense fungal biomat or portion thereof. Depending on the fungus and growth conditions, the filamentous fungal biomass may also exhibit a fibrous texture, which is an important consideration when producing food compositions that require texture to simulate meat (i.e. a meat analog food product); in some embodiments, the fibrous structure of the biomass may be engineered or oriented to provide a material (and thus, in some cases, a food composition or product) that is relatively difficult or relatively easy to tear, or has selected portions that are relatively difficult or relatively easy to tear. The dense nature of the biomass can also enable easy harvesting, without the need for a concentration step (e.g., centrifugation, filtration) between harvesting of the biomass and processing into a food composition. The density of the biomass can range from about 0.01 g dry weight/cm$^3$ to about 1 g/cm$^3$, and any subrange within this range. In some embodiments, the density can be greater than about 0.01, greater than about 0.02, greater than about 0.03, greater than about 0.04, greater than about 0.05, greater than about 0.06, greater than about 0.07, greater than about 0.08, greater than about 0.09, greater than about 0.1, greater than about 0.2, greater than about 0.3, greater than about 0.4, greater than about 0.5, greater than about 0.6, greater than about 0.7, greater than about 0.8, greater than about 0.9, or greater than about 1 g/cm$^3$. In some embodiments, relatively dry fungal biomass may be ground or otherwise size-reduced into relatively fine particles, e.g. a filamentous fungal "flour," before being incorporated into the food composition of the invention; in these embodiments, densities in the above-referenced ranges or even higher may be achieved due to the packing density of the dry fungal flour. In other embodiments, fungal biomass may be ground or otherwise size-reduced into somewhat coarser particles (e.g., in which at least 90% of the particles have a length of between about 4 mm and about 10 mm, and/or a width of between about 1 mm and about 3 mm, and/or a height of up to about 0.75 mm), as is more typical of ground or processed meat.

Another advantage and benefit of the methods of manufacture of filamentous fungal food compositions according to the present invention is that material and/or mechanical properties of the filamentous fungal biomass as it is produced (e.g. in the form of a fungal biomat) may be preserved, or even enhanced, during processing into the filamentous fungal food composition. By way of first non-limiting example, the methods of manufacture disclosed herein may preserve or enhance a filamentous structure or network of a filamentous fungal biomat used to produce the food composition, which may be advantageous, for example, to maintain a high internal surface area suitable for absorption or other uptake of, e.g., flavoring or nutritional additives, smoke, food colorings, etc. By way of second non-limiting example, the methods of manufacture disclosed herein may preserve or enhance the tensile strength of a filamentous fungal biomat used to produce the food composition. In embodiments, the filamentous fungal food composition, or a portion thereof comprising filamentous fungal biomass, may have a tensile strength of at least about 30 g/cm$^2$, at least about 40 g/cm$^2$, at least about 50 g/cm$^2$, at least about 60 g/cm$^2$, at least about 70 g/cm$^2$, at least about 80 g/cm$^2$, at least about 90 g/cm$^2$, at least about 100 g/cm$^2$, at least about 150 g/cm$^2$, at least about 200 g/cm$^2$, at least about 250 g/cm$^2$, at least about 300 g/cm$^2$, at least about 350 g/cm$^2$, at least about 400 g/cm$^2$, at least about 450 g/cm$^2$, at least about 500 g/cm$^2$, at least about 550 g/cm$^2$, or at least about 600 g/cm$^2$, or at least about 650 g/cm$^2$, or at least about 700 g/cm$^2$, or at least about 750 g/cm$^2$, or at least about 800 g/cm$^2$, or at least about 850 g/cm$^2$, or at least about 900 g/cm$^2$, or at least about 950 g/cm$^2$, or at least about 1000 g/cm$^2$, or at least about 1500 g/cm$^2$, or at least about 2000 g/cm$^2$, or at least about 2500 g/cm$^2$, or at least about 3000 g/cm$^2$, or at least about 3500 g/cm$^2$, or at least about 4000 g/cm$^2$. In other embodiments, biomass of the invention (e.g. a fungal biomat) can have a tensile strength of greater than any whole number greater than 30 g/cm$^2$. Alternatively, the tensile strength of biomass of the invention (e.g. a fungal biomat) can be in a range of between about 30 g/cm$^2$ and about 4000 g/cm$^2$ or any whole number range between about 30 g/cm$^2$ and about 4000 g/cm$^2$. In embodiments in which the filamentous fungal biomass is produced as a biomat, the biomat may have sufficient tensile strength to be lifted essentially intact from the surface of a growth medium at the end of a growth period.

In many embodiments, the filamentous fungal biomass of the food composition will provide a substantial fraction of the protein in the food composition. Particularly, the filamentous fungal biomass may provide at least about 20 wt %, at least about 25 wt %, at least about 30 wt %, at least about 35 wt %, at least about 40 wt %, at least about 45 wt %, 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, at least about 99 wt %, or substantially all of the protein in the food composition. In some embodiments, the protein content of the filamentous fungal biomass may allow the filamentous fungal biomass to take the place of a protein-rich ingredient found in an analogous conventional food product, particularly an animal-derived ingredient (e.g. meat), whereas in other embodiments the filamentous fungal biomass may be provided in addition to or as a partial replacement for a protein-rich ingredient to augment the protein content of the food product. The filamentous fungal biomass may comprise at least about 20 wt %, at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 41 wt %, at least about 42 wt %, at least about 43 wt %, at least about 44 wt %, at least about 45 wt %, at least about 46 wt %, at least about 47 wt %, at least about 48 wt %, at least about 49 wt %, at least about 50 wt %, at least about 51 wt %, at least about 52 wt %, at least about 53 wt %, at least about 54 wt %, at least about 55 wt %, at least about 56 wt %, at least about 57 wt %, at least about 58 wt %, at least about 59 wt %, at least about 60 wt %, at least about 61 wt %, at least about 62 wt %, at least about 63 wt %, at least about 64 wt %, at least about 65 wt %, at least about 66 wt %, at least about 67 wt %, at least about 68 wt %, at least about 69 wt %, at least about 70 wt %, at least about 71 wt %, at least about 72 wt %, at least about 73 wt %, at least about 74 wt %, at least about 77 wt %, at least about 76 wt %, at least about 77 wt %, at least about 78 wt %, at least about 79 wt %, or at least about 80 wt % protein content. Alternatively, in embodiments of the invention, filamentous fungi can comprise protein in a range between 20 wt % and 80 wt % or in any whole number percentage range between 20 wt % and 80 wt %. As a result, the filamentous fungal food compositions of the present invention may thus have a notably high or enriched protein and/or fiber content. Thus, on a dry weight basis (or, in other words, at the same moisture content), the food compositions of the invention may be higher in protein than analogous conventional food products, and/or, by the same token, the food compositions of the invention may provide the same protein content as an analogous conventional food product in a smaller mass and/or serving size.

In some embodiments, food compositions and products according to the present disclosure may comprise at least about 10 wt %, at least about 11 wt %, at least about 12 wt %, at least about 13 wt %, at least about 14 wt %, at least about 15 wt %, at least about 16 wt %, at least about 17 wt %, at least about 18 wt %, at least about 19 wt %, at least about 20 wt %, at least about 21 wt %, at least about 22 wt %, at least about 23 wt %, at least about 24 wt %, or at least about 25 wt % protein content. Alternatively, in embodiments, food compositions and products according to the present disclosure can comprise protein in a range between 10 wt % and 25 wt % or in any whole number percentage range between 10 wt % and 25 wt %. As a result, the filamentous fungal food compositions of the present invention may thus have a notably high or enriched protein and/or fiber content. Thus, on a dry weight basis (or, in other words, at the same moisture content), the food compositions of the present disclosure may be higher in protein than analogous conventional food products, and/or, by the same token, the food compositions of the present disclosure may provide the same protein content as an analogous conventional food product in a smaller mass and/or serving size.

In addition to having a high overall protein content, filamentous fungal biomass in food compositions of the present invention may provide advantageous protein compositions or chemistries. By way of first non-limiting example, the filamentous fungal biomass may represent a "complete" protein source by providing all nine essential amino acids. By way of second non-limiting example, the filamentous fungal biomass may comprise at least one branched-chain amino acid (e.g. leucine, isoleucine, valine), and may in some embodiments contain such amino acids in amounts of at least about 10 wt %, at least about 15 wt %, at least about 20 wt %, at least about 25 wt %, or at least about 30 wt %.

A further nutritional or compositional advantage provided by the food compositions of the present invention is that they may be lower in fat than analogous conventional food products. Particularly, the filamentous fungal food compositions of the present invention may have a total fat content of less than about 30 wt %, less than about 25 wt %, less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt %, or less than about 5 wt %.

A further nutritional or compositional advantage provided by the food compositions of the present invention is that the filamentous fungi may be produced by methods that enable the filamentous fungi to contain functional compounds that may not be present in, or cannot be delivered by, conventional food products. By way of first non-limiting example, the growth media in which filamentous fungi are produced may be imparted with any one or more beneficial nutrients or compounds (vitamins, lipids, glycolipids, polysaccharides, sugar alcohols, ω-3 fatty acids, etc.) that may be taken up by the fungus and thus passed on to the consumer of the food composition. By way of second non-limiting example, the growth media in which filamentous fungi are produced may be imparted with any one or more compounds (e.g. pigments, inks, dyes, fragrances, etc.) that may be taken up by the fungus and improve an aesthetic or sensory quality of the filamentous fungus.

A further nutritional or compositional advantage provided by the food compositions of the present invention is that the compositions may be free of allergens, antibiotics, and/or animal-derived products that may otherwise prevent persons with allergenic sensitivities or dietary restrictions (e.g. vegans or vegetarians) from consuming analogous conventional food products. By way of non-limiting example, analogs of a wide variety of conventional meat products (e.g. smoked meat products, meat jerky, etc.) that are meat-free, that are optionally also lactose-free, egg-free, soy-free, and/or dairy-free, and/or that are further optionally vegan, may be produced according to the present invention. Even more advantageously, these problematic ingredients can in some embodiments be replaced by components having nutritional benefits, e.g. red meat may be replaced by fungal filaments or mycelia (i.e. tissues not having the potential adverse effects on cardiovascular health presented by red meat).

A further nutritional or compositional advantage provided by the food compositions of the present invention is that they may have an advantageously high content of dietary fiber to allow for the creation of high-fiber food products (and in particular high-fiber alternatives to or analogs of conventional food products, particularly conventional meat products, that may have lower fiber contents). In some embodiments, the filamentous fungal particles may comprise at least about 6 wt %, at least about 7 wt %, at least about 8 wt %, at least about 9 wt %, or at least about 10 wt % dietary fiber. Additionally or alternatively, the food composition may have a dietary fiber content of at least about 1 gram, at least about 2 grams, at least about 3 grams, at least about 4 grams, at least about 5 grams, at least about 6 grams, at least about 7 grams, at least about 8 grams, at least about 9 grams, at least about 10 grams, at least about 11 grams, at least about 12 grams, at least about 13 grams, or at least about 14 grams of dietary fiber per 28 grams of food composition. A high fiber content may be advantageous for any one or more additional reasons not directly related to nutritional composition, e.g. improved hydration properties (such as decreased water activity to allow for easier preparation/storage and longer shelf life), increased satiation or "fullness" upon eating (which may encourage consumers to eat more moderate portions and thereby aid in preventing or mitigating adverse health effects such as high cholesterol), improved digestibility, improved digestion and/or prevention of constipation, etc. Particularly, increased satiation or "fullness" may allow consumers to consume fewer total calories and thereby aid, for example, a dieting consumer in losing weight. The filamentous fungal food compositions of the invention may therefore be particularly suitable or advantageous for inclusion in known and/or commercially available weight loss diets or regimens.

In embodiments of the present invention, methods for preparing a filamentous fungal food composition comprise dehydrating a filamentous fungal biomass, in some embodiments a fungal biomat, at relatively low temperature, e.g. no more than about 185° F. and most typically no more than about 165° F., over a period of, e.g., between about 20 minutes and about 12 hours. Typically, a low-temperature drying oven or dehydrator may be employed to carry out dehydration of the filamentous fungal biomass, as may a smoker, a vacuum dehydration system, tumble-drying (at either ambient pressure or under vacuum), or any other suitable apparatus or method for lowering the moisture content and water activity of the filamentous fungal biomass while otherwise retaining the fungal material's basic structure. A moisture content of the filamentous fungal biomass after the dehydration step may be no more than about 45 wt %, no more than about 44 wt %, no more than about 43 wt %, no more than about 42 wt %, no more than about 41 wt %, no more than about 40 wt %, no more than about 39 wt %, no more than about 38 wt %, no more than about 37 wt %, no more than about 36 wt %, no more than about 35 wt %, no more than about 34 wt %, no more than about 33 wt %, no more than about 32 wt %, no more than about 31 wt %, no more than about 30 wt %, no more than about 29 wt %, no more than about 28 wt %, no more than about 27 wt %, no more than about 26 wt %, no more than about 25 wt %, no more than about 24 wt %, no more than about 23 wt %, no more than about 22 wt %, no more than about 21 wt %, no more than about 20 wt %, no more than about 19 wt %, no more than about 18 wt %, no more than about 17 wt %, no more than about 16 wt %, no more than about 15 wt %, no more than about 14 wt %, no more than about 13 wt %, no more than about 12 wt %, no more than about 11 wt %, no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, or no more than about 1 wt %. Alternatively, a moisture content of the filamentous fungal biomass after the dehydration step can be any whole number range between 1 wt % and 45 wt %.

The filamentous fungi suitable for use in the invention may be selected from the phyla or divisions zygomycota, glomermycota, chytridiomycota, basidiomycota or ascomycota. The phylum (or division) basidiomycota comprises, inter alia, the orders Agaricales, Russulales, Polyporales and Ustilaginales; the phylum ascomycota comprises, inter alia, the orders Pezizales and Hypocreales; and the phylum zygomycota comprises, inter alia, the order Mucorales. The edible filamentous fungi of the present invention may belong to an order selected from Ustilaginales, Russulales, Polyporales, Agaricales, Pezizales, Hypocreales and Mucorales.

In some embodiments, the filamentous fungi of the order Ustilaginales are selected from the family Ustilaginaceae. In some embodiments, the filamentous fungi of the order Russulales are selected from the family Hericiaceae. In some embodiments, the filamentous fungi of the order Polyporales are selected from the families Polyporaceae or Grifolaceae. In some embodiments, the filamentous fungi of the order Agaricales are selected from the families Lyophyllaceae, Strophariaceae, Lycoperdaceae, Agaricaceae, Pleurotaceae, Physalacriaceae, or Omphalotaceae. In some embodiments, the filamentous fungi of the order Pezizales are selected from the families Tuberaceae or Morchellaceae. In some embodiments, the filamentous fungi of the order Mucorales are selected from the family Mucoraceae.

In some embodiments, the filamentous fungi may be selected from the genera *Fusarium, Aspergillus, Trichoderma, Rhizopus, Ustilago, Hericululm, Polyporous, Grifola, Hypsizygus, Calocybe, Pholiota, Calvatia, Stropharia, Agaricus, Hypholoma, Pleurotus, Morchella, Sparassis, Disciotis, Cordyceps, Ganoderma, Flammulina, Lentinula, Ophiocordyceps, Trametes, Ceriporia, Leucoagaricus, Handkea, Monascus* and *Neurospora*.

Examples of the species of filamentous fungi include, without limitation, *Ustilago esculenta, Hericululm erinaceus, Polyporous squamosus, Grifola fondrosa, Hypsizygus marmoreus, Hypsizygus ulmariuos* (elm oyster) *Calocybe gambosa, Pholiota nameko, Calvatia gigantea, Agaricus bisporus, Stropharia rugosoannulata, Hypholoma lateritium, Pleurotus eryngii, Pleurotus ostreatus* (pearl), *Pleurotus ostreatus* var. *columbinus* (Blue oyster), *Tuber borchii, Morchella esculenta, Morchella conica, Morchella importuna, Sparassis crispa* (cauliflower), *Fusarium venenatum, Fusarium* strain *flavolapis* (ATCC Accession Deposit No. PTA-10698), *Disciotis venosa, Cordyceps militaris, Ganoderma lucidum* (reishi), *Flammulina velutipes, Lentinula edodes, Ophiocordyceps sinensis*. Additional examples include, without limitation, *Trametes versicolor, Ceriporia lacerate, Pholiota gigantea, Leucoagaricus holosericeus, Pleurotus djamor, Calvatia fragilis, Handkea utriformis, Rhizopus oligosporus*, and *Neurospora crassa*.

In some embodiments, the filamentous fungus is a *Fusarium* species. In some embodiments, the filamentous fungus is the *Fusarium* strain *flavolapis* (ATCC PTA-10698 deposited with the American Type Culture Collection, 1081 University Boulevard, Manassas, Virginia, USA). This strain, which has been referred to in some previous work as strain MK7, was previously reported to be a *Fusarium oxysporum* strain. However, it has subsequently been identified as not being an *oxysporum* strain and is considered a novel strain of *Fusarium* that has now been provisionally named *Fusarium* str. *flavolapis*. In some embodiments, the filamentous fungus is the *Fusarium* strain *Fusarium venenatum*.

Fungal biomass from which the filamentous fungal material in food compositions of the invention is derived may be produced by any known fermentation processes, such as, e.g., submerged, solid-state, membrane, or surface fermentation processes as described in PCT Application Publications WO 2017/151684, WO 2019/046480, or WO 2020/176758 or PCT Application PCT/US2020/064208 (the entireties of all of which are incorporated herein by reference), and/or a method as disclosed in PCT Application Publication WO2019/099474.

In some embodiments, the filamentous fungal biomass may be in the form of one or more filamentous fungal biomats produced by a surface fermentation process. In certain of these embodiments, parameters of the surface fermentation process may be selected or controlled to provide a desired morphology or structure to the filamentous fungal biomat and thus to the resulting food composition. By way of first non-limiting example, the surface fermentation process may be controlled such that fungal mycelia are oriented predominantly parallel to an interface between a liquid fermentation medium and the atmosphere or headspace above the fermentation medium, thereby ensuring that the mycelia grow primarily in a single plane (which may provide desired textural or mechanical characteristics to the resulting food composition or a portion thereof). By way of second non-limiting example, trays or vessels in which a filamentous fungus is grown in a surface fermentation process may be substantially longer than they are wide (or vice versa) to provide a similar "oriented" structure of the fungal mycelia. By these and other methods, which will be appreciate by those of ordinary skill in the art, multiple biomats and/or layers of filamentous fungal biomass, having similar or different geometric orientations of mycelia, may be "stacked" or "weaved" to obtain a layered food composition having preselected textural or mechanical characteristics.

Food compositions, including but not necessarily limited to meat analog food products, according to the present invention may further include proteins, such as a hydrophobin. These are low molecular weight proteins, ranging from about 100 to 150 amino acids in length, and are amphipathic molecules that are capable of self-assembly at a hydrophobic-hydrophilic interface into amphipathic films. Various uses for hydrophobins have been described in the art, including as emulsifiers, thickeners, or surfactants; for hydrophilizing hydrophobic surfaces; for improving the water stability of hydrophilic substrates; and for preparing oil-in-water emulsions or water-in-oil emulsions, and they have applications in pharmaceutical and cosmetic as well as food compositions. In food products, hydrophobins have been shown to impact the formation and stability of air bubbles, thus assisting in foamability and foam stabilization (for instance, hydrophobins provide foam volume stability and inhibition of coarsening of foods), inhibiting growth of ice crystals in frozen food products, and affecting agglomeration of fats, thus improving the texture, stability, and storage time of aerated and/or frozen food compositions.

Accordingly, some embodiments of the present invention may include a hydrophobin. Hydrophobins are generally classified into class I and class II; while class I hydrophobins are relatively insoluble, class II hydrophobins readily dissolve in a variety of solvents and therefore are generally preferred. Hydrophobins and like proteins have been identified in filamentous fungi and bacteria, and their sequences are described in the art. All of these proteins, including class I and class II hydrophobins, are encompassed by the present invention. Hydrophobins suitable for use in the present invention may be isolated from natural sources, or by recombinant means. In some embodiments, the hydrophobins may be added to the food compositions as purified proteins. In some embodiments, the hydrophobins may be expressed by the filamentous fungal species used in the food composition and thus supplied as part of the fungal biomass. In embodiments, filamentous fungal biomass used in food compositions and food products according to the present disclosure may include at least about 500 reads per kilobase of transcript per million mapped reads (RPKM), at least about 1,000 RPKM, at least about 1,500 RPKM, at least about 2,000 RPKM, at least about 2,500 RPKM, or at least about 3,000 RPKM of class I hydrophobins, and/or at least about 1 RPKM, at least about 2 RPKM, at least about 3 RPKM, at least about 4 RPKM, at least about 5 RPKM, at least about 6 RPKM, or at least about 7 RPKM of class II hydrophobins.

Referring now to FIG. 1A, a first embodiment of a method 100 for making a meat analog food product, such as, by way of non-limiting example, a shredded meat analog food product, according to an embodiment of the present invention, is illustrated. As shown in FIG. 1A, this embodiment of the method 100 comprises a biomass production step 110, an inactivation step 120, a refrigeration step 130, a solution preparation step 135, a vacuum agitation step 140, a vacuum shaping step 150, a crust freezing step 160, an optional size reduction step 170, and an optional post-processing step 180.

In the biomass production step 110 of the embodiment of the method 100 illustrated in FIG. 1A, a biomass of filamentous fungus is produced by any suitable method as known and described in the art, such as, by way of non-limiting example, a surface fermentation method as described in PCT Application Publication 2020/176758.

In the inactivation step 120 of the embodiment of the method 100 illustrated in FIG. 1A, the filamentous fungal biomass produced in step 110 is inactivated, e.g., by steaming. In some embodiments, the filamentous fungal biomass may be a filamentous fungal biomat or relatively large (e.g. about 3 to about 5 inches wide) pieces thereof; it is to be expressly understood that size reduction of the biomass, if carried out at this stage of the method 100, may be undertaken before, simultaneous with, and/or after inactivation step 120.

In the refrigeration step 130 of the embodiment of the method 100 illustrated in FIG. 1A, the filamentous fungal biomass is cooled to a temperature of no more than about 34° F. The refrigeration step 130 ensures complete inactivation of the filamentous fungus and hardens (and thereby improves the workability) of the filamentous fungal biomass for downstream processing steps.

In the solution preparation step 135 of the embodiment of the method 100 illustrated in FIG. 1A, one or more food additives (e.g. salt, seasonings, nutritional additions, etc.) are dissolved and/or suspended in water. Preferably, the solution prepared in solution preparation step 135 is provided below room temperature (e.g. at a temperature of about 40° F.); the solution may be cooled before, simultaneous with, or after addition of the food additive solutes to water. Solution preparation step 135 may be carried out before, simultaneous with, or after refrigeration step 130. In some embodiments, the solution prepared in solution preparation step 135 may comprise one or more proteins to provide the food product with a desired functionality and/or augment the total protein content of the food product.

It is to be expressly understood that, although not illustrated in FIG. 1A or provided for in the embodiment of the method 100 depicted therein, the solution prepared in solution preparation step 135 need not always be aqueous, and/or may include one or more solvents in addition to water. By way of non-limiting example, such solvents may include cooking oils, an oleovitamin solution, and the like. Embodiments in which the solution prepared in solution preparation step 135 is non-aqueous are therefore expressly contemplated as within the scope of the present invention.

Although not illustrated in FIG. 1A, it is to be expressly understood that in some embodiments, the fungal biomass, at any time after inactivation step 120 but before the beginning of vacuum agitation step 140, may be subjected to any one or more mechanical or texturizing treatments to provide the finished food product with a desired structure, texture, mouthfeel, etc. By way of non-limiting example, where it is desired to provide the finished food product with a "softer" or more "tender" mouthfeel, the fungal biomass may be tenderized using a multi-blade (e.g., Jaccard-style or similar) meat tenderizer to sever and/or disentangle long filaments in the fungal biomass.

In the vacuum agitation step 140 of the embodiment of the method 100 illustrated in FIG. 1A, the refrigerated filamentous fungal biomass produced in step 130 and the cold aqueous solution prepared in step 135 are placed together in a vacuum tumbler; most typically, vacuum agitation step 140 is a cold vacuum agitation step carried out under refrigeration (i.e. at a temperature of no more than about 40° F.), but vacuum agitation step 140 may alternatively be carried out at room temperature or under heating to above room temperature. The atmosphere in the vacuum tumbler is then evacuated to leave a low vacuum (i.e. an absolute pressure of between about 3 kilopascals and about 100 kilopascals), a medium vacuum (i.e. an absolute pressure of between about 100 millipascals and about 3 kilopascals), a high vacuum (i.e. an absolute pressure of between about 100 nanopascals and about 100 millipascals), an ultra-high vacuum (i.e. an absolute pressure of between about 100 picopascals and about 100 nanopascals), or an extremely high vacuum (i.e. an absolute pressure of less than about 100 picopascals) in the tumbler. The filamentous fungal biomass and the aqueous solution are then agitated together to allow the aqueous solution to permeate the filamentous fungal biomass. Those skilled in the art will understand how to select appropriate agitation times, methods, and speeds; by way of non-limiting example, the vacuum tumbler may be a rotary tumbler, and the filamentous fungal biomass and aqueous solution may be rotated together at a speed of between about 7 RPM and about 10 RPM for a total time of about 40 minutes. It is to be expressly understood that the filamentous fungal biomass and aqueous solution may be agitated two or more times, with rest periods between periods of agitation (e.g., two 20-minute agitation periods with a 10-minute rest period in between), as may be appreciated by those skilled in the art. As a result of vacuum agitation step 140, the filamentous fungal biomass will absorb or otherwise take up at least a portion of the aqueous solution (in some embodiments, up to about 30% of the initial weight of the filamentous fungal biomass).

Where the filamentous fungal biomass is in the form of a biomat or relatively large pieces thereof, the sub-atmospheric pressure of vacuum agitation step 140 may affect any one or more of several physical properties of the biomat. By way of non-limiting example, exposure to this high-vacuum environment may enlarge spaces between fungal mycelia in the matrix of the biomat, increasing the available surface area of mycelia available for contact with the aqueous solution. This effect may, without wishing to be bound by any particular theory, explain the observation by the present inventors that filamentous fungal biomass agitated with an aqueous solution comprising salt in vacuum agitation step 140 tasted much saltier than expected; it is possible that increased mycelial surface area in contact with the salty aqueous solution allowed for a greater proportion of salt to be deposited on the surface of fungal mycelia, and/or increased the time required for the salt deposited on the surface of fungal mycelia to be transferred to the taste buds of the consumer upon consumption, and/or increases the surface area of the food product in contact with the taste-sensitive tissues in a consumer's mouth. In this way, it may be possible for filamentous fungal food compositions according to the present invention to have the further advantage and benefit of delivering a flavor to a consumer over a longer time.

In the vacuum shaping step 150 of the embodiment of the method 100 illustrated in FIG. 1A, the filamentous fungal biomass, having absorbed or otherwise taken up at least some portion of the aqueous solution (in some embodiments, up to about 30% of the initial weight of the filamentous fungal biomass), is placed in a cavity or mold, and the atmosphere surrounding the cavity or mold is evacuated to leave a high vacuum (i.e. an absolute pressure of no more than about 0.1 pascals). This allows the filamentous fungal biomass to be placed in a desired shape or other physical configuration, and/or to undergo various physical deformations or operations, and/or for one portion of the filamentous fungal biomass to have a first density and another portion of the filamentous fungal biomass to have a second density; by way of non-limiting example, where it is desired to produce a sausage analog food product, the filamentous fungal biomass may be stuffed into a casing. In many embodiments, it may be desirable to form the filamentous fungal biomass into a "log" or "rod," i.e., an approximately cylindrical mass. The vacuum shaping step 150 may also affect the density of the filamentous fungal biomass and/or properties of a mycelial network thereof, which may, by way of non-limiting example, further increase mycelial surface area and/or permeability of the fungal biomass for application of further functional or nutritional additives. It is therefore to be expressly understood that the filamentous fungal biomass may, but need not, be contacted with one or more flavorings or other functional or nutritional additives, whether in a solid, liquid, or gas form, as part of vacuum shaping step 150.

It is to be expressly understood that, in the practice of the embodiment of the method 100 illustrated in FIG. 1A, vacuum agitation step 140 and vacuum shaping step 150 may be repeated as many times as necessary. Particularly, where it is desirable to coat or impregnate a functional coating or additive onto or into any one or more of (1) spaces between fungal filaments, e.g. pores in a fungal biomat, (2) the surfaces of fungal filaments, and/or (3) the interiors of fungal filaments, repeated vacuum agitation steps 140 and/or vacuum shaping steps 150 may be necessary to ensure complete absorption by, or coating or coverage of, the fungal mycelia.

Without wishing to be bound by any particular theory, it is believed that one functional benefit of the sub-atmospheric pressure applied to filamentous fungal biomass in vacuum agitation step 140 and vacuum shaping step 150 is that these pressures cause the fungal biomass to expand, thereby increasing the volume of interstitial spaces between hyphae and other fungal structures. As a result, additives applied during these steps may more readily infiltrate these spaces. Subsequently, when the mat is once again exposed to ambient or atmospheric pressures, the fungal biomass contracts, thus causing the additive(s) present in the interstitial spaces to be firmly entrapped within the fungal biomass.

In the crust freezing step 160 of the embodiment of the method 100 illustrated in FIG. 1A, the shaped filamentous fungal biomass is placed in a blast freezer and rapidly cooled (in some embodiments, at a rate of at least about 0.35° C. per minute), for example, to an internal temperature of between about 25° F. and about 27° F. This temperature range has been found by the present inventors to provide optimum conditions for the processing steps of the method 100 that follow.

In the optional size reduction step 170 of the embodiment of the method 100 illustrated in FIG. 1A, the blast-frozen filamentous fungal biomass is cut, shredded, and/or shaved into smaller pieces, which may in some embodiments be suitable for use as a shredded meat analog. Most typically, the strips, shreds, or shavings of filamentous fungal biomass will preferably have a thickness of between about 0.1 millimeters and about 10 millimeters, as this range is most analogous to conventional shredded meat products. Any size-reducing means, including but not necessarily limited to a gravity slicer or conventional deli meat slicer, may be used to carry out size reduction step 170.

In the optional post-processing step 180 of the embodiment of the method 100 illustrated in FIG. 1A, the size-reduced filamentous fungal biomass may be subjected to any one or more forms of post-processing analogous to those used to prepare smoked or cured meat products or similar. By way of first non-limiting example, the size-reduced filamentous fungal biomass may be vacuum-steamed (e.g. to an internal temperature of about 85° C. for a period of about 12 minutes) to form a steamed meat analog food product. By way of second non-limiting example, the size-reduced filamentous fungal biomass may be cold-smoked (e.g. for a period of about four hours at a temperature of about 90° F.)

to form a cold-smoked meat analog food product. By way of third non-limiting example, the size-reduced filamentous fungal biomass may be hot-smoked (e.g. for a period of about two hours at a temperature of about 230° F.) to form a hot-smoked meat analog food product. By way of fourth non-limiting example, the size-reduced filamentous fungal biomass may cooked by any other suitable cooking technique, such as, e.g., roasting, baking, boiling, and/or frying. In general, any form(s) of post-processing to which a raw whole cut of meat or raw shredded meat may be subjected can be applied, mutatis mutandis, to the size-reduced filamentous fungal biomass to form an analogous filamentous fungal food product. Post-processing step 180 may be carried out when the size-reduced filamentous fungal biomass is frozen, refrigerated, or at room temperature.

In some embodiments, size reduction step 170 and/or post-processing step 180 may comprise extruding a fungal paste into long strips. This extrusion step may be carried out by any suitable device or method and may be particularly suitable or advantageous, by way of non-limiting example, to provide a food composition having a desired cross-sectional shape (especially if the desired cross-sectional shape is intricate or complex), to prevent (or deliberately impart) a selected type of physical stress (e.g. compressive stress, shear stress, etc.) to the food composition, to improve a finished appearance of the food composition, and/or to create a food composition that is analogous in appearance or structure to a conventional food product that is ordinarily provided in thin or narrow strips (e.g. jerky, bacon, etc.). Additional or alternative thermal or mechanical manipulations may be employed as part of size reduction step 170 and/or post-processing step 180, such as non-extrusive shearing, heating (with or without simultaneous shearing, e.g., to coagulate proteins and/or carbohydrates), freezing, thawing, etc.

Figure 1B:
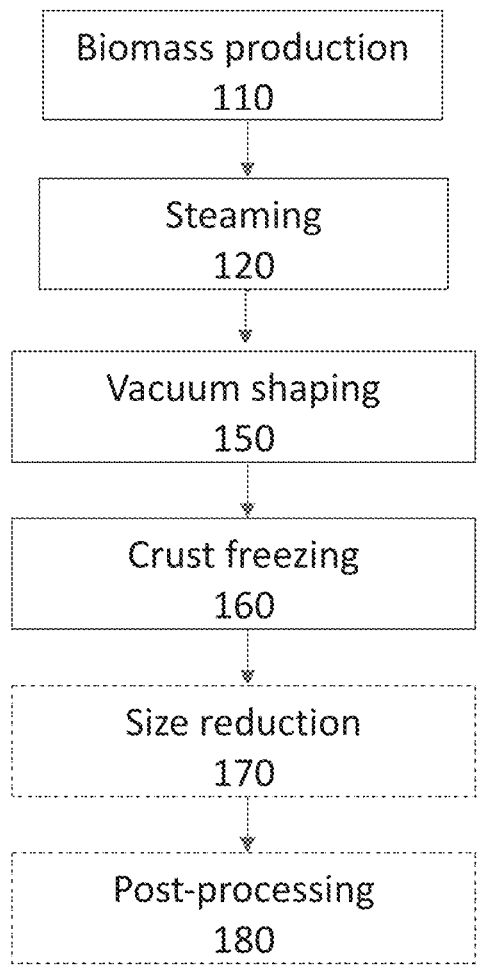

Referring now to FIG. 1B, a second embodiment of a method 100 for making a meat analog food product, such as, by way of non-limiting example, a shredded meat analog food product, according to an embodiment of the present invention, is illustrated. As shown in FIG. 1B, this embodiment of the method 100 comprises a biomass production step 110, an inactivation step 120, a vacuum shaping step 150, a crust freezing step 160, an optional size reduction step 170, and an optional post-processing step 180.

In the biomass production step 110 of the embodiment of the method 100 illustrated in FIG. 1B, a biomass of filamentous fungus is produced by any suitable method as known and described in the art, such as, by way of non-limiting example, a surface fermentation method as described in PCT Application Publication 2020/176758.

In the inactivation step 120 of the embodiment of the method 100 illustrated in FIG. 1B, the filamentous fungal biomass produced in step 110 is inactivated, e.g., by steaming. In some embodiments, the filamentous fungal biomass may be a filamentous fungal biomat or relatively large (e.g. about 1 inch wide) pieces thereof; it is to be expressly understood that size reduction of the biomass, if carried out at this stage of the method 100, may be undertaken before, simultaneous with, and/or after inactivation step 120.

In the vacuum shaping step 150 of the embodiment of the method 100 illustrated in FIG. 1B, the filamentous fungal biomass, having absorbed or otherwise taken up at least some portion of the aqueous solution (in some embodiments, up to about 30% of the initial weight of the filamentous fungal biomass), is placed in a cavity or mold, and the atmosphere surrounding the cavity or mold is evacuated to leave a high vacuum (i.e. an absolute pressure of no more than about 0.1 pascals). This allows the filamentous fungal biomass to be placed in a desired shape or other physical configuration and/or to undergo various physical deformations or operations; by way of non-limiting example, where it is desired to produce a sausage analog food product, the filamentous fungal biomass may be stuffed into a casing. In many embodiments, it may be desirable to form the filamentous fungal biomass into a "log," i.e., an approximately cylindrical mass. The vacuum shaping step 150 may also affect the density of the filamentous fungal biomass and/or properties of a mycelial network thereof, which may, by way of non-limiting example, further increase mycelial surface area and/or permeability of the fungal biomass for application of further functional or nutritional additives. It is therefore to be expressly understood that the filamentous fungal biomass may, but need not, be contacted with one or more flavorings or other functional or nutritional additives, whether in a solid, liquid, or gas form, as part of vacuum shaping step 150.

Without wishing to be bound by any particular theory, it is believed that one functional benefit of the sub-atmospheric pressure applied to filamentous fungal biomass in vacuum shaping step 150 is that these pressures cause the fungal biomass to expand, thereby increasing the volume of interstitial spaces between hyphae and other fungal structures. Subsequently, when the mat is once again exposed to ambient or atmospheric pressures, the fungal biomass contracts. Again without wishing to be bound by any particular theory, it is believed that another functional benefit of the sub-atmospheric pressure applied to filamentous fungal biomass in vacuum shaping step 150 is that this may beneficially alter surface behavior of the mycelia.

In the crust freezing step 160 of the embodiment of the method 100 illustrated in FIG. 1B, the shaped filamentous fungal biomass is placed in a blast freezer and rapidly cooled, for example, to an internal temperature of between about 25° F. and about 27° F. This temperature range has been found by the present inventors to provide optimum conditions for the processing steps of the method 100 that follow.

In the size reduction step 170 of the embodiment of the method 100 illustrated in FIG. 1B, the blast-frozen filamentous fungal biomass is cut, shredded, and/or shaved into smaller pieces suitable for use as a meat analog. Most typically, the strips, shreds, or shavings of filamentous fungal biomass will preferably have a thickness of between about 0.1 millimeters and about 10 millimeters, as this range is most analogous to conventional meat products. to which the fungal products are analogous. Any size-reducing means, including but not necessarily limited to a gravity slicer or conventional deli meat slicer, may be used to carry out size reduction step 170.

In the optional post-processing step 180 of the embodiment of the method 100 illustrated in FIG. 1B, the size-reduced filamentous fungal biomass may be subjected to any one or more forms of post-processing analogous to those used to prepare smoked or cured meat products or similar. By way of first non-limiting example, the size-reduced filamentous fungal biomass may be vacuum-steamed (e.g. to an internal temperature of about 85° C. for a period of about 12 minutes) to form a steamed meat analog food product. By way of second non-limiting example, the size-reduced filamentous fungal biomass may be cold-smoked (e.g. for a period of about four hours at a temperature of about 90° F.) to form a cold-smoked meat analog food product. By way of third non-limiting example, the size-reduced filamentous fungal biomass may be hot-smoked (e.g. for a period of about two hours at a temperature of about 230° F.) to form a hot-smoked meat analog food product. In general, any form(s) of post-processing to which a raw whole cut of meat or raw shredded meat may be subjected can be applied, mutatis mutandis, to the size-reduced filamentous fungal biomass to form an analogous filamentous fungal food product. Post-processing step 180 may be carried out when the size-reduced filamentous fungal biomass is frozen, refrigerated, or at room temperature.

In some embodiments, size reduction step 170 and/or post-processing step 180 may comprise extruding a fungal paste into long strips. This extrusion step may be carried out by any suitable device or method and may be particularly suitable or advantageous, by way of non-limiting example, to provide a food composition having a desired cross-sectional shape (especially if the desired cross-sectional shape is intricate or complex), to prevent (or deliberately impart) a selected type of physical stress (e.g. compressive stress, shear stress, etc.) to the food composition, to improve a finished appearance of the food composition, and/or to create a food composition that is analogous in appearance or structure to a conventional food product that is ordinarily provided in thin or narrow strips (e.g. jerky, bacon, etc.). Additional or alternative thermal or mechanical manipulations may be employed as part of size reduction step 170 and/or post-processing step 180, such as non-extrusive shearing, heating (with or without simultaneous shearing, e.g., to coagulate proteins and/or carbohydrates), freezing, thawing, etc.

The difference between the two embodiments of the method 100 illustrated in FIGS. 1A and 1B is that refrigeration step 130, solution preparation step 135, and vacuum agitation step 140 are omitted in the embodiment illustrated in FIG. 1B. Which embodiment of the method 100 is employed will depend on the desired flavor and intended use of the resulting meat analog food product; the method illustrated in FIG. 1A will generally yield a pre-flavored product suitable for use in, e.g., processed meat analog or smoked meat analog food products (e.g., bacon analog food products, jerky analog food products, etc.), whereas the method illustrated in FIG. 1B will generally yield a food product having a more neutral flavor profile suitable for use in raw or whole-cut meat analog food products. This flexibility of use is yet another benefit of the present invention, in that the method 100 can be used to produce any of a wide variety of meat analog food products.

Figure 2A:
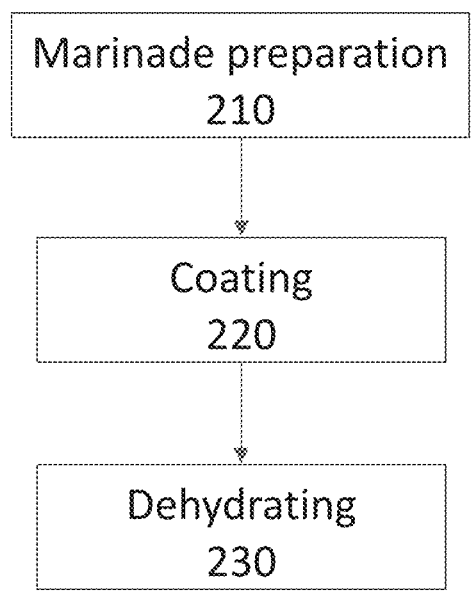
FIGS. 2A and 2B are flowcharts depicting embodiments of a method for processing a filamentous fungal food material, derived from a fungal biomat and processed according to the method depicted in FIG. 1A, into a meat jerky analog food product, according to embodiments of the present disclosure.
Figure 2B:
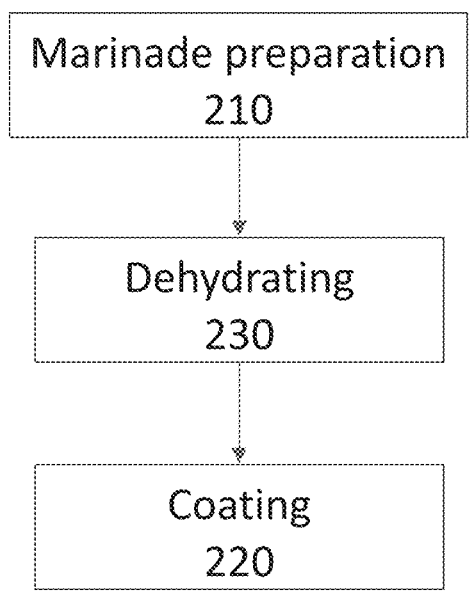

Referring now to FIGS. 2A and 2B, a method 200 for making a meat jerky analog food product according to an embodiment of the present invention, is illustrated. As shown in FIGS. 2A and 2B, the method 200 comprises a marinade preparation step 210, a coating step 220, and a dehydrating step 230.

In the marinade preparation step 210 of the method 200, a marinade in which a filamentous fungal food material produced according to the method 100 illustrated in FIG. 1A will be marinated, is prepared. Such a marinade can include any one or more ingredients commonly found in marinades for conventional meat products, including but not necessarily limited to meat jerky, but in some embodiments may include higher or lower amounts of these ingredients than in such conventional meat marinades. As in conventional meat marination processes, marinades prepared according to marinade preparation step 210 will be liquids adapted to impart flavor to and/or tenderize or otherwise impart texture to the filamentous fungal biomass; as such, the marinades may (but need not) include one or more acidic ingredients (e.g. vinegar, lemon juice, wine) and/or one or more enzymatic ingredients (e.g. pineapple, papaya, yogurt, ginger), and may further include oils, herbs, and/or spices to further flavor the filamentous fungal biomass. Those skilled in the culinary arts will readily understand how to prepare an appropriate marinade according to marinade preparation step 210.

In the coating step 220 of the method 200, a filamentous fungal food material produced according to the method 100 illustrated in FIG. 1A is marinated in, i.e. coated with, the marinade prepared in marinade preparation step 210, either at room temperature or under refrigeration. (Thus, any one or more steps 210, 220, 230 of method 200 can be considered a post-processing step 180 of method 100.) Most commonly, the coating step 220 may be carried out for a period of between about two seconds and about two days (i.e. as is typical of marination processes for conventional meat jerky products) at any temperature within a wide range (e.g. under refrigeration to at least as low as about 0° C., at ambient temperatures, and/or under elevated temperatures of at least as high as about 40° C.), but in some embodiments, because filamentous fungal biomass does not spoil as readily as meat (whether at room temperature or under refrigeration), the coating step 220 may be carried out for a longer time to further impart flavor and/or tenderize the biomass. Without wishing to be bound by any particular theory, variations in coating step 220 temperatures and times may affect the internal structure of the filamentous fungal biomass and thus allow for different extents to which marinade is "entrapped" within the biomass. Coating step 220 may or may not include agitation or mixing of the filamentous fungal food material with the marinade, but it is generally desirable to ensure that substantially all sides and/or surfaces of the filamentous fungal food material are coated with the marinade, whether by agitation/mixing or by providing enough of the marinade in an appropriate vessel to completely soak or submerge the filamentous fungal food material for a desired residence or marination time. The coating step 220 may additionally or alternatively comprise any other means of coating the fungal biomass with the marinade, e.g. dipping the fungal biomass in the marinade, spraying the fungal biomass with the marinade (with or without subsequent drying), etc.

In some embodiments, coating step 220 optionally may, but need not, comprise application of a stabilizer or mold inhibitor, e.g. potassium sorbate, to further increase the shelf life of the resulting food composition; in some embodiments, the stabilizer or mold inhibitor may also have an aesthetic or sensory benefit (e.g. potassium sorbate is a salty-tasting compound that stimulates salivation and contributes to a salty flavor). It is to be expressly understood, however, that application of a stabilizer and/or mold inhibitor may be omitted, and it may be preferable to omit this application in some embodiments.

In the dehydrating step 230 of the method 200, the filamentous fungal food material produced according to the method 100 illustrated in FIG. 1A is dehydrated at relatively low temperature, e.g. no more than about 165° F., over a period of between about 20 minutes and about 12 hours, and most commonly between about 2 hours and about 5 hours. Typically, a low-temperature drying oven or dehydrator may be employed to carry out dehydrating step 230, as may a smoker, a vacuum dehydration system, tumble-drying (at either ambient pressure or under vacuum), or any other suitable apparatus or method for lowering the moisture content and water activity of the filamentous fungal food material while otherwise retaining the fungal material's basic structure.

The difference between the two embodiments of the method 200 illustrated in FIGS. 2A and 2B is in the ordering of steps—coating step 220 may be carried out before dehydrating step 230, as in FIG. 2A, or vice versa, as in FIG. 2B. Which embodiment of the method 200 is employed will depend on the desired texture of the resulting meat jerky analog food product; the method illustrated in FIG. 2A will generally yield a "chewy" texture akin to a true meat jerky, whereas the method illustrated in FIG. 2B will generally yield a "crispy" texture like that of a potato or tortilla chip. This flexibility in the ordering of steps is yet another benefit of the present invention, in that the method 200 can be used to produce a true jerky analog food product, or alternatively a novel food product having a combination of meat jerky flavor with a "crispy," chip-like texture that may not be attainable using meat. In practice, the methods 200 of FIGS. 2A and 2B are, or may be, generally identical, with the exception that, because the marinade prepared in marinade preparation step 210 generally has a high moisture content, dehydrating step 230 may be carried out for a longer time (typically four to five hours) if preceded by the coating step 220 and for a shorter time (typically two to three hours) if preceding the coating step 220.

The invention is further described by the following illustrative, non-limiting Examples.

Example 1

Pieces of a filamentous fungal food material were produced according to the method 100 illustrated in FIG. 1A. Subsequently, a marinade comprising 8.6 wt % nutritional yeast, 5.2 wt % garlic powder, 25 wt % olive oil, 47 wt % soy sauce, 9.4 wt % maple syrup, 4 wt % ground black pepper, and 0.8 wt % paprika was prepared by mixing all ingredients together until homogeneous. The filamentous fungal food material was then thoroughly coated with this marinade such that the marinated filamentous fungal food material comprised a fungal biomass: marinade weight ratio of 19:1 (i.e. 95 wt % fungal biomass to 5 wt % marinade). The pieces of marinated filamentous fungal food material were then placed on trays, with care taken to ensure that no two pieces touched each other, and dehydrated in a conventional dehydrator at 160° F. for between four and five hours. The resulting meat jerky analog food product had a taste like that of a conventional beef jerky and a similarly analogous chewy texture.

The meat jerky analog food product was found to have a water activity of 0.4894 and a moisture content of 14.09 wt %. These values are comparable to, or even better (i.e. drier) than, a conventional meat jerky food product.

Example 2

Pieces of a filamentous fungal food material were produced according to the method 100 illustrated in FIG. 1A and placed on trays, with care taken to ensure that no two pieces touched each other. The pieces of filamentous fungal food material were then dehydrated in a conventional dehydrator at 160° F. for between two and four hours. Subsequently, a marinade comprising 8.6 wt % nutritional yeast, 5.2 wt % garlic powder, 25 wt % olive oil, 47 wt % tamari soy sauce, 9.4 wt % maple syrup, 4 wt % ground black pepper, and 0.8 wt % paprika was prepared by mixing all ingredients together until homogeneous. The dehydrated filamentous fungal food material was then thoroughly coated with this marinade such that the marinated filamentous fungal food material comprised a fungal biomass:marinade weight ratio of 19:1 (i.e. 95 wt % fungal biomass to 5 wt % marinade). The resulting meat jerky analog food product had a taste like that of a conventional beef jerky, but, rather than exhibiting a typical "chewy" meat jerky texture, instead had a "crispy" texture like that of a potato or tortilla chip.

Example 3

Pieces of a filamentous fungal food material were produced according to the method 100 illustrated in FIG. 1A and subsequently dehydrated in a conventional dehydrator at 160° F. for two hours, without prior marination. After dehydration, some pieces were marinated with the marinade of Examples 1 and 2 ("Jerky A"), while others were left unmarinated and instead placed in a bath of room-temperature water for two hours ("unmarinated Jerky A"). Separately, two other jerky analog products were produced: a jerky analog product produced according to a second run of the method described in Example 1 ("Jerky C") and a jerky analog product produced according to the method described in Example 1, except that the filamentous fungal biomass was vacuum-tumbled with the marinade for 30 minutes rather than being surface-coated ("Jerky B"). In Jerkies B and C, the amount of marinade relative to the fungal biomass was also varied relative to the method described in Example 1; specifically, the fungal biomass was marinated in an equal (1:1) mass of marinade.

Samples of each of marinated Jerky A, Jerky B, and Jerky C were weighed before marination (i.e. fungal biomass only), with applied marinade before dehydration, and after dehydration. The water activity and moisture content of each jerky after dehydration was then assessed. All three jerkies were made using filamentous fungal biomass taken from a fungal biomat having a starting moisture content of 79.84%. The results of these tests are given in Table 1.

TABLE 1

|  | Jerky A | Jerky B | Jerky C |
| --- | --- | --- | --- |
| Pre-marination mass (fungus only) | 95.4 g | 95 g | 91.5 g |
| Post-marination mass (before dehydration) | n/a | 165.5 g | 165.7 g |
| Post-dehydration mass | 24.7 g | 67.72 g | 73.14 g |
| Post-dehydration water activity | 0.64 | 0.371 | 0.459 |
| Post-dehydration moisture content | 28.89% | 20.17% | 23.58% |

Figure 3A:
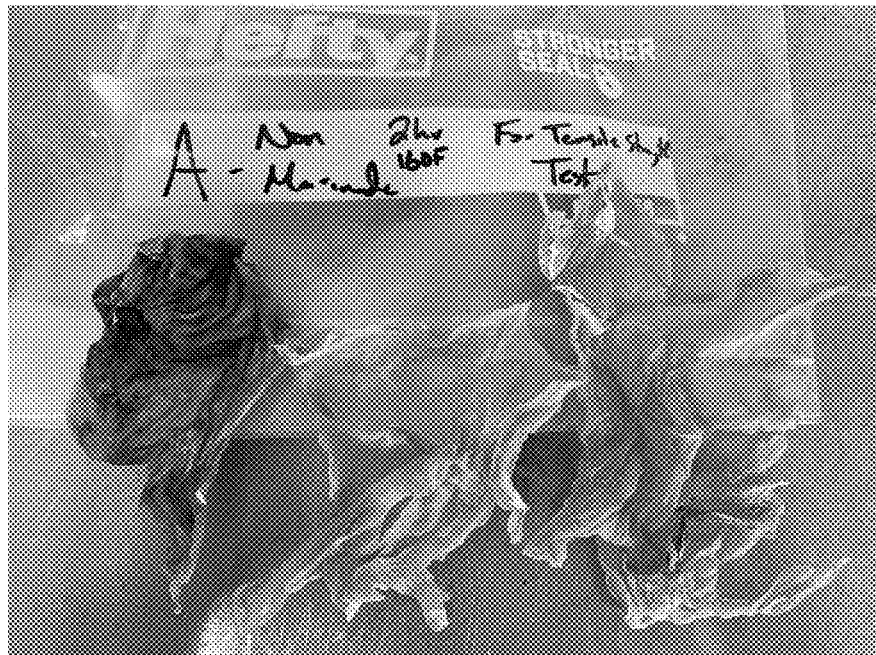
FIGS. 3A, 3B, and 3C are images of pieces of three jerky analog food products, according to embodiments of the present invention.
Figure 3B:
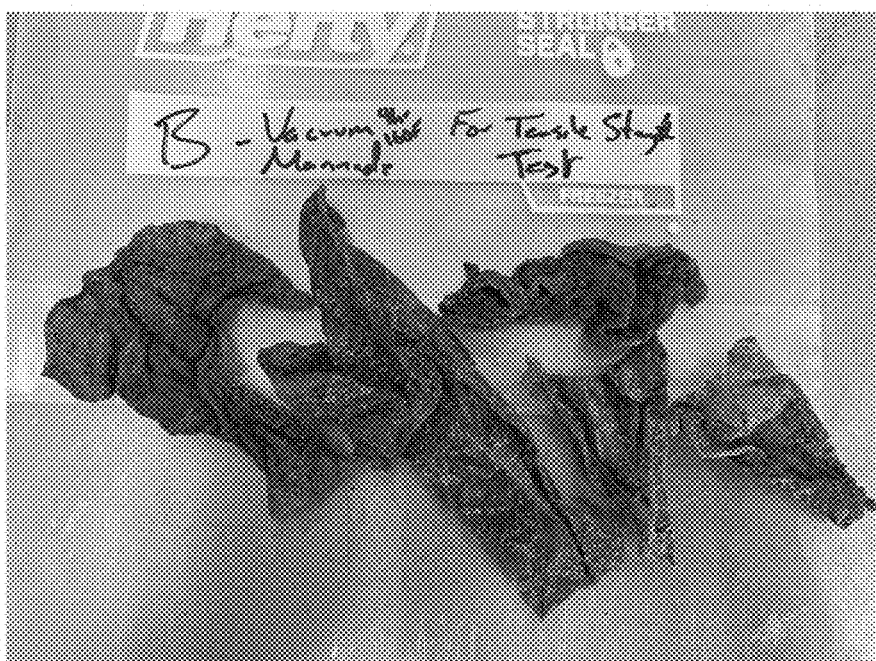
Figure 3C:

Images of samples of unmarinated Jerky A, Jerky B, and Jerky C are shown in FIGS. 3A, 3B, and 3C, respectively. The densities of Jerkies B and C were recorded as 0.74 and 0.73 g/cm$^3$, respectively.

The three jerkies differed greatly in their qualitative sensory impressions. Jerky A was observed to extremely crispy and brittle, with a tendency to undergo glass-like shattering, and had the least flavor even when marinade was applied. Jerky B was thin and crispy (though less so than Jerky A), with increased marinade flavor compared to Jerky A. Jerky C was by far the most similar in sensory evaluation to a conventional, shelf-stable, soft, chewy meat jerky; it was chewier and softer than Jerkies A and B and had a strong spicy and smoky flavor imparted by the marinade.

Example 4

Three unmarinated samples of Jerky A produced in Example 3 were placed into a room-temperature water bath for 30 minutes, 1 hour, and 2 hours, respectively, and weighed both before and after rehydration to determine the water reuptake capabilities of Jerky A. The results are given in Table 2.

TABLE 2

| Time in water | 30 minutes | 1 hour | 2 hours |
| --- | --- | --- | --- |
| Pre-dehydration mass | NR | NR | 5.04 g |
| Pre-rehydration mass | 2.01 g | 2.72 g | 1.37 g |
| Post-rehydration mass | 4.89 g | 7.44 g | 3.77 g |
| % mass increase | 243% | 274% | 275% |
| % original water | NR | NR | 74.8% |

Air bubbles were observed when dry jerky products were immersed in water, showing very active rehydration of all samples tested.

Without wishing to be bound by any particular theory, the present inventors hypothesize that tightly bound water is, for the most part, not removed during dehydration in all samples. However, physically bound water and free water, held in, e.g., the capillaries and porous structure of the fungal biomass adds to the range of texture development in jerky products. While the moisture content of the dried jerky products is 24%±4%, their water activities (reported in Example 3) show that jerkies with a wide range of textures can be produced. The subsequent rehydration of the jerky products highlights the novel porous structure of the jerky products, where water droplets can be held and contribute to the plasticized properties of the jerky products. During this subsequent rehydration, liquid can enter the fungal structure where free water was previously present, but some physically bound water (~25 wt % of the total water) cannot be regained due to loss of fungal structures during dehydration. This mechanism would account for reuptake of less than all of the starting mass of moisture during rehydration. Thus, the present invention can be viewed as providing a method to maintain the porous structure of filamentous fungal biomass during dehydration, and particularly to leverage this porous structure to precisely control and/or select a desired extent of liquid removal from the fungal material. In this way, a desired water activity, e.g. of less than about 0.45, can be selected.

Example 5

Figure 4A:
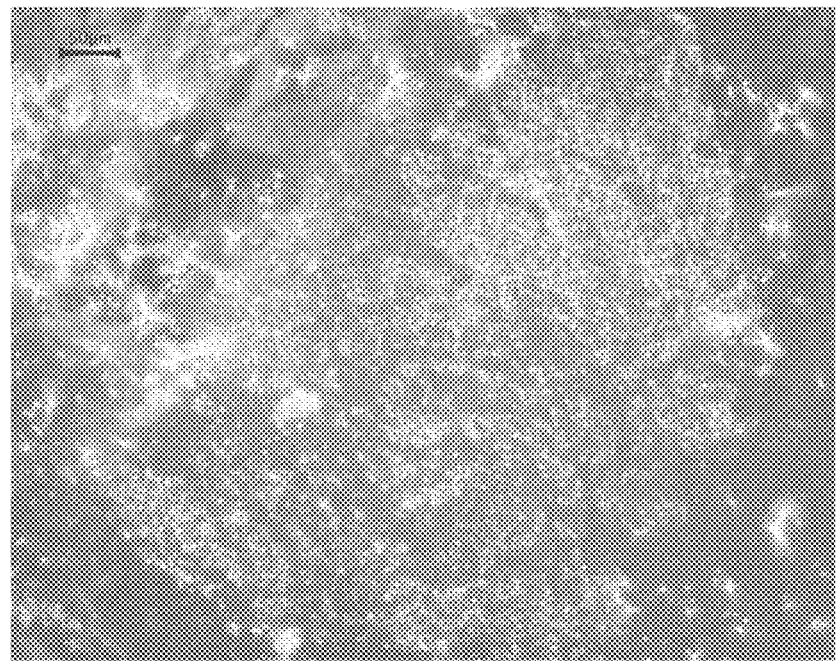
FIGS. 4A and 4B are microscopic images of a hydrophilic side of a jerky analog food product, according to embodiments of the present invention.
Figure 4B:
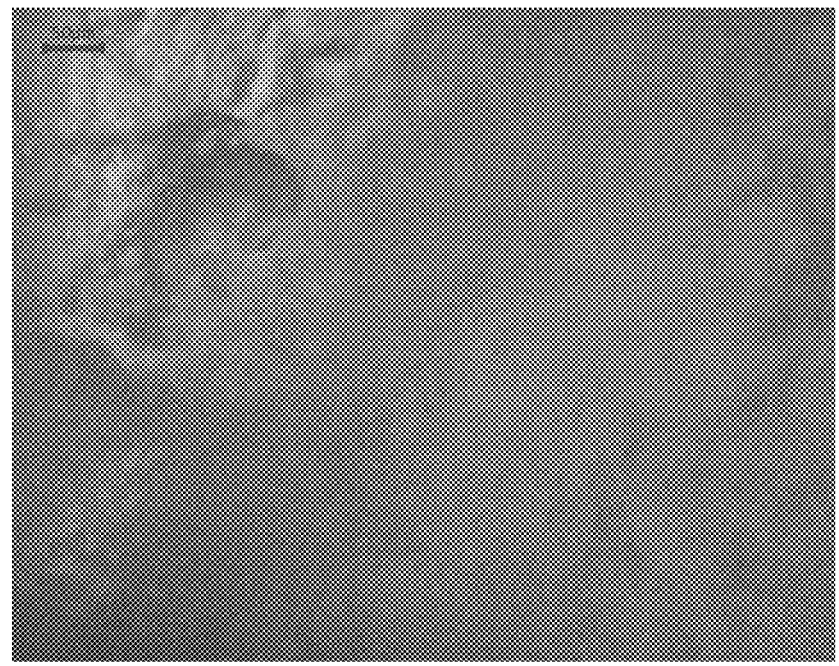

Microscopic images of a whole piece of Jerky C were taken from a portion of the piece corresponding to a hydrophilic side of the filamentous fungal biomat. These images are shown as FIGS. 4A (light both above and below the sample) and 4B (light below the sample only). These images show small holes in the post-dehydration biomat. Without wishing to be bound by any particular theory, these images support the hypothesis that, while some fungal mat structure may be destroyed during processing, most of the mat structure may remain intact.

The Jerky C piece was then laid flat, and two parallel lines, lying close to one another, were cut using a utility knife. The sample was then turned onto the side on which the knife passed. This procedure allowed the capture of two microscopic images: one of a hydrophobic side of the jerky piece (FIG. 5A) and one from a hydrophilic side (FIG. 5B).

Figure 5A:
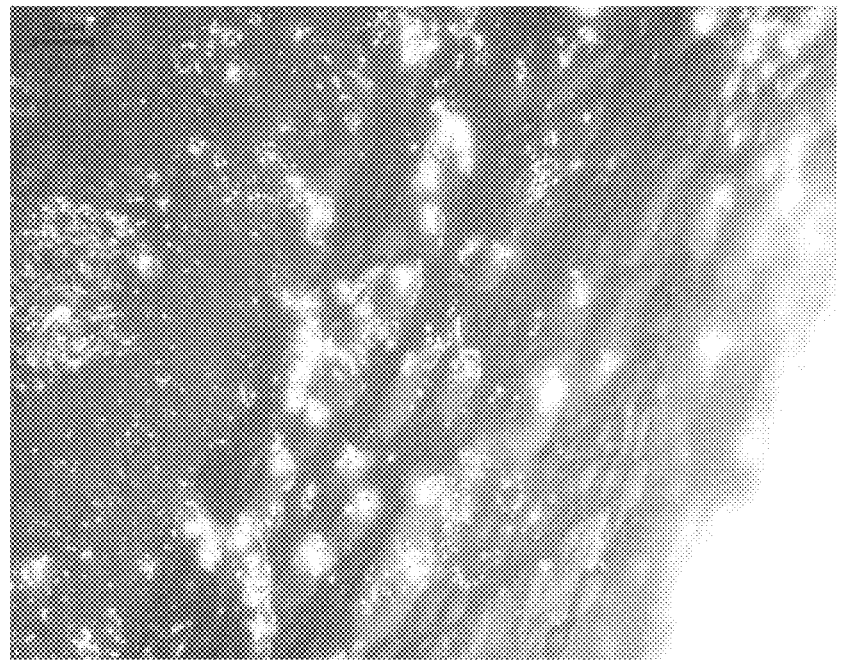
FIGS. 5A and 5B are microscopic images of a hydrophobic side and a hydrophilic side, respectively, of a jerky analog food product, according to embodiments of the present invention.

In FIG. 5A, the center or innermost part of the sample is on the left side of the image, while the edge of the sample is on the right side of the image. As FIGS. 5A and 5B illustrate, the smallest degree of structural deformation is observed near the center of the sample, with deformation increasing (e.g. larger pores) toward the edge of the sample.

Figure 5B:
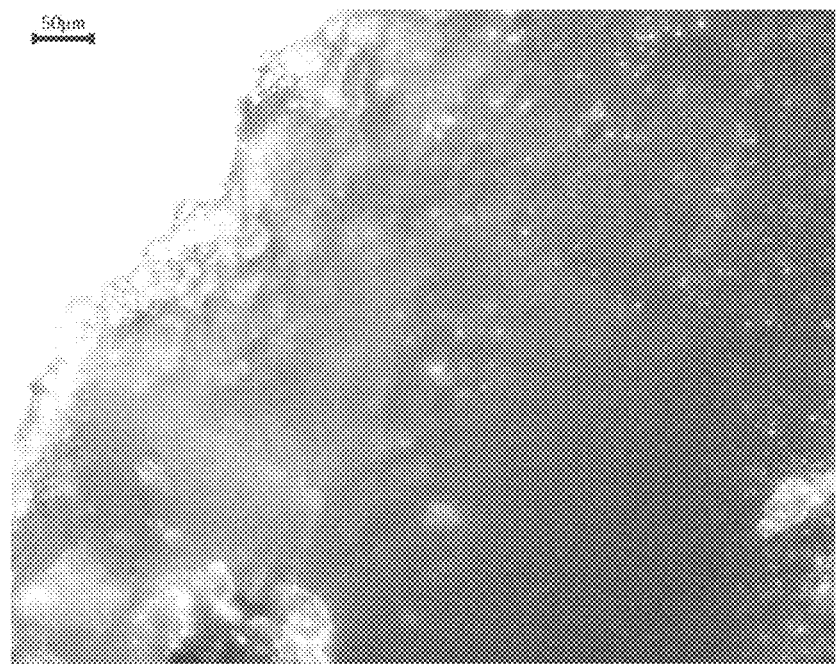

In FIG. 5B, the left side of the image represents the opposite edge of the sample relative to FIG. 5A. The structure appears significantly denser. Without wishing to be bound by any particular theory, it is believed that the hydrophilic side of a filamentous fungal biomat, which grows submersed in or on the surface of a liquid (aqueous) growth medium, grows to have a denser structure because the hydrophobic (i.e. atmosphere-facing) side of the biomat is where aerial hyphae, having a filamentous structure, are formed.

Example 6

Pieces of unmarinated Jerky A, Jerky B, and Jerky C were prepared for tensile strength and strain-at-break testing. It was quickly discovered that pieces of unmarinated Jerky A could not be tested due to their brittleness; these samples were either impossible to cut for testing or would shatter when placed in the grips of the testing apparatus. Pieces of Jerky B were noticeably brittle, but flat sections of the pieces were malleable enough to allow for cutting of testing samples, and Jerky B was found to have a maximum tensile strength of 1.10±0.51 MPa and a strain at break of 1.75%±0.71%. Pieces of Jerky C were much more malleable, making them much easier to cut samples from, and Jerky C was found to have a maximum tensile strength of 1.98±0.66 MPa and a strain at break of 8.08%±0.81%.

Figure 6A:
FIGS. 6A and 6B are images of fractured tensile strength testing specimens of jerky analog food products, according to embodiments of the present invention.
Figure 6B:
Figure 7:
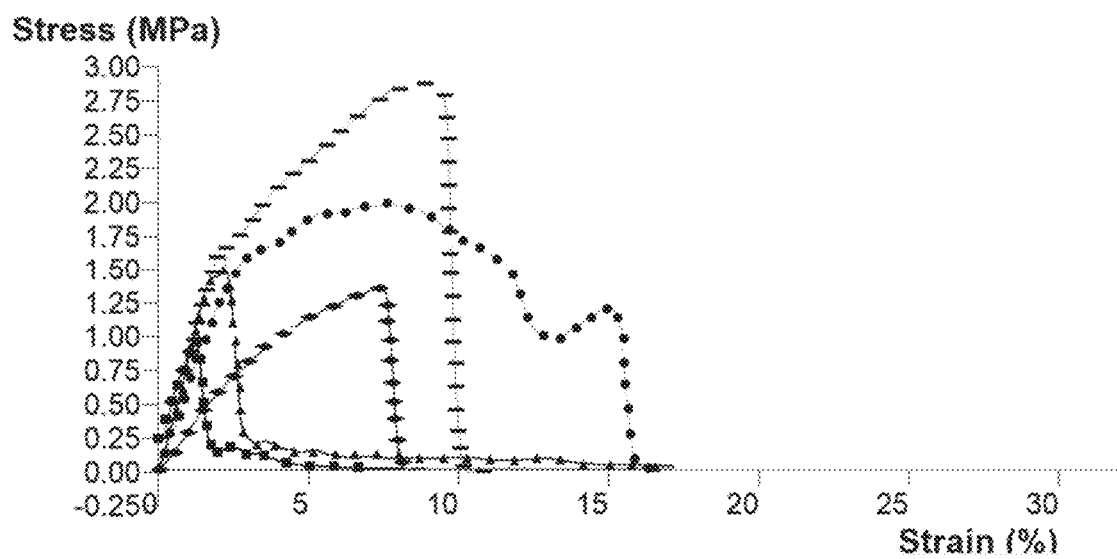
FIG. 7 is a graph of tensile strength testing results of the specimens illustrated in FIGS. 6A and 6B.

The specimens tested for tensile strength and strain at break are shown in FIGS. 6A (Jerky B) and 6B (Jerky C). As FIGS. 6A and 6B clearly illustrate, Jerky B exhibited brittle fractures, while Jerky C exhibited more elastic fractures. The stress-strain curves for two tested samples of Jerky B and three tested samples of Jerky C, shown in FIG. 7, confirm this observation; in FIG. 7, the two samples of Jerky B are represented by the square and triangle data points, while the three samples of Jerky C are represented by the dash, circle, and diamond data points.

The invention illustratively disclosed herein suitably may be practiced in the absence of any element which is not specifically disclosed herein. It is apparent to those skilled in the art, however, that many changes, variations, modifications, other uses, and applications of the invention are possible, and changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, regardless of whether such alternate, interchangeable, and/or equivalent structures, functions, ranges, or steps are disclosed herein, and without intending to publicly dedicate any patentable subject matter.

The invention claimed is:

1. A method for making a meat analog food product, comprising:
   applying a vacuum to a filamentous fungal biomass in a cavity or mold; and
   heating the filamentous fungal biomass,
   wherein, as a result of the applying step, at least one of the following is true:
   (i) the filamentous fungal biomass is placed in a desired shape;
   (ii) the filamentous fungal biomass undergoes a physical deformation; and
   (iii) one portion of the filamentous fungal biomass has a first density and another portion of the filamentous fungal biomass has a second density different from the first density.

2. The method of claim 1, wherein the vacuum is applied to the filamentous fungal biomass in a cavity.

3. The method of claim 1, wherein the vacuum is applied to the filamentous fungal biomass in a mold.

4. The method of claim 1, wherein the meat analog food product is selected from the group consisting of a whole-cut meat analog food product, a ground meat analog food product, a meatloaf analog food product, a burger patty analog food product, a shredded meat analog food product, and a meat jerky analog food product.

5. The method of claim 1, wherein the meat analog food product is adapted for consumption by a domesticated animal, a farmed animal, or a livestock animal.

6. The method of claim 1, wherein the heating is carried out for about two hours.

7. The method of claim 1, further comprising dehydrating the filamentous fungal to a moisture content of no more than 45 wt %.

8. The method of claim 7, wherein the filamentous fungal biomass is dehydrated to a moisture content of no more than 30 wt %.

9. The method of claim 1, wherein the heating comprises steaming, smoking, or both.

10. The method of claim 1, further comprising, contacting the filamentous fungal biomass with one or more additives.

11. The method of claim 10, wherein the one or more additives infiltrate a number of interstitial spaces of the filamentous fungal biomass.

12. The method of claim 1, further comprising inactivating the filamentous fungal biomass.

13. The method of claim 1, wherein the filamentous fungal biomass comprises fungal mycelia.

14. The method of claim 13, wherein the fungal mycelia comprise a fungal mycelium of a genus selected from the group consisting of *Fusarium, Aspergillus, Trichoderma, Rhizopus, Ustilago, Hericium, Polyporus, Grifola, Hypsizygus, Calocybe, Pholiota, Calvatia, Stropharia, Agaricus, Hypholoma, Pleurotus, Morchella, Sparassis, Disciotis, Cordyceps, Ganoderma, Flammulina, Lentinula, Ophiocordyceps, Trametes, Ceriporia, Leucoagaricus, Handkea, Monascus*, and *Neurospora*.

15. The method of claim 13, wherein the fungal mycelia comprise a fungal mycelium selected from the group consisting of *Ustilago esculenta, Hericium erinaceus, Polyporus squamosus, Grifola frondosa, Hypsizygus marmoreus, Hypsizygus ulmarius, Calocybe gambosa, Pholiota nameko, Calvatia gigantea, Agaricus bisporus, Stropharia rugosoannulata, Hypholoma lateritium, Pleurotus eryngii, Pleurotus ostreatus, Tuber borchii, Morchella esculenta, Morchella conica, Morchella importuna, Sparassis crispa, Fusarium venenatum, Fusarium* strain *flavolapis* (ATCC Accession Deposit No. PTA-10698), *Disciotis venosa, Cordyceps militaris, Ganoderma lucidum, Flammulina velutipes, Lentinula edodes, Ophiocordyceps sinensis, Trametes versicolor, Ceriporia lacerata, Pholiota gigantea, Leucoagaricus holosericeus, Pleurotus djamor, Calvatia fragilis, Handkea utriformis, Rhizopus oligosporus, Neurospora crassa*, and combinations thereof.

16. The method of claim 13, wherein the fungal mycelia comprise a fungal mycelium of *Neurospora crassa*.

17. A method for making a meat analog food product, comprising:
   contacting a filamentous fungal biomass with a gas in a cavity or mold; and
   heating the filamentous fungal biomass to a temperature of less than about 185° F.

18. The method of claim 17, wherein the meat analog food product is selected from the group consisting of a whole-cut meat analog food product, a ground meat analog food product, a meatloaf analog food product, a burger patty analog food product, a shredded meat analog food product, and a meat jerky analog food product.

19. The method of claim 18, wherein the meat analog food product has a chewiness analogous to a meat jerky product.

20. The method of claim 17, wherein the heating is carried out for about two hours.

21. The method of claim 17, wherein the heating comprises steaming, smoking, or both.

22. The method of claim 17, further comprising contacting the filamentous fungal biomass with one or more additives.

23. The method of claim 22, wherein the one or more additives infiltrate a number of interstitial spaces of the filamentous fungal biomass.

24. The method of claim 17, further comprising inactivating the filamentous fungal biomass.

25. The method of claim 17, wherein the filamentous fungal biomass comprises fungal mycelia.

26. The method of claim 25, wherein the fungal mycelia comprise a fungal mycelium of a genus selected from the group consisting of *Fusarium, Aspergillus, Trichoderma, Rhizopus, Ustilago, Hericium, Polyporus, Grifola, Hypsizygus, Calocybe, Pholiota, Calvatia, Stropharia, Agaricus, Hypholoma, Pleurotus, Morchella, Sparassis, Disciotis, Cordyceps, Ganoderma, Flammulina, Lentinula, Ophiocordyceps, Trametes, Ceriporia, Leucoagaricus, Handkea, Monascus*, and *Neurospora*.

27. The method of claim 25, wherein the fungal mycelia comprise a fungal mycelium selected from the group consisting of *Ustilago esculenta, Hericium erinaceus, Polyporus squamosus, Grifola frondosa, Hypsizygus marmoreus, Hypsizygus ulmarius, Calocybe gambosa, Pholiota nameko, Calvatia gigantea, Agaricus bisporus, Stropharia rugosoannulata, Hypholoma lateritium, Pleurotus eryngii, Pleurotus ostreatus, Tuber borchii, Morchella esculenta, Morchella conica, Morchella importuna, Sparassis crispa, Fusarium venenatum, Fusarium* strain MK7 (ATCC Accession Deposit No. PTA-10698), *Disciotis venosa, Cordyceps mili-*

*taris, Ganoderma lucidum, Flammulina velutipes, Lentinula edodes, Ophiocordyceps sinensis, Trametes versicolor, Ceriporia lacerata, Pholiota gigantea, Leucoagaricus holosericeus, Pleurotus djamor, Calvatia fragilis, Handkea utriformis, Rhizopus oligosporus, Neurospora crassa*, and combinations thereof.

28. The method of claim 27, wherein the fungal mycelia comprise a fungal mycelium of *Neurospora crassa*.

\* \* \* \* \*